US012000191B2

(12) United States Patent
Jaroff et al.

(10) Patent No.: US 12,000,191 B2
(45) Date of Patent: Jun. 4, 2024

(54) METHOD OF MAKING AND USING A FOOT OPERABLE DOOR OPENER

(71) Applicant: Joseph Ivan Jaroff, Old Westbury, NY (US)

(72) Inventors: Joseph Ivan Jaroff, Old Westbury, NY (US); James Polk, Kent Lakes, NY (US); Yefim Safris, Golden Valley, MN (US)

( * ) Notice: Subject to any disclaimer, the term of this patent is extended or adjusted under 35 U.S.C. 154(b) by 0 days.

(21) Appl. No.: 18/198,250

(22) Filed: May 16, 2023

(65) Prior Publication Data

US 2023/0366253 A1 Nov. 16, 2023

Related U.S. Application Data

(62) Division of application No. 17/345,898, filed on Jun. 11, 2021, now Pat. No. 11,692,384.

(60) Provisional application No. 63/102,377, filed on Jun. 12, 2020.

(51) Int. Cl.

| | |
|---|---|
| ***E05F 13/00*** | (2006.01) |
| ***E05F 11/54*** | (2006.01) |
| ***E05F 13/02*** | (2006.01) |

(52) U.S. Cl.
CPC .............. *E05F 11/54* (2013.01); *E05F 13/02* (2013.01); *E05Y 2201/706* (2013.01); *E05Y 2201/72* (2013.01); *E05Y 2800/116* (2013.01)

(58) Field of Classification Search
CPC ... E05F 11/54; E05F 13/02; E05F 3/02; E05F 3/14; E05F 13/04; E05Y 2201/706; E05Y 2201/72; E05Y 2201/256; E05Y 2201/264; E05Y 2201/626; E05Y 2201/676; E05Y 2201/688; E05Y 2900/132
USPC .......... 49/263, 264, 265, 267, 272, 273, 274
See application file for complete search history.

(56) References Cited

U.S. PATENT DOCUMENTS 11,692,384 B2 * 7/2023 Jaroff ...................... E05F 11/54
49/324
2019/0048638 A1 * 2/2019 Janda ...................... E05F 11/22
2021/0388659 A1 * 12/2021 Jaroff ...................... E05F 11/54

* cited by examiner

*Primary Examiner* — Jerry E Redman
(74) *Attorney, Agent, or Firm* — Allen R. Morganstern; Alfred M. Walker

(57) ABSTRACT

A method of using a foot operable door opener which operates, without using one's hands, and without electrical assist. Signage is provided on the door showing that the entrance cycle is initiated by the entrant stepping on a pedal, actuating an initial delay, allowing the entrant to comfortably step aside to clear the path of swinging of the door, while a second delay assembly provides for a delayed release of the drive wheel at an end of the opening cycle, to allow ergonomic passage, which allows the entrant to comfortably step through an open portal of the door before integrated closing devices close the door behind the entrant.

12 Claims, 18 Drawing Sheets

DASHPOT DIAGRAM
OF TIME DELAY SYSTEM FOR FOOT OPERABLE DOOR OPENER
WITH DASHPOT DAMPER

310 Top Left Front ISO View Pedal Down

METHOD OF MAKING AND USING A FOOT OPERABLE DOOR OPENER

RELATED APPLICATIONS

The present application is a divisional of application Ser. No. 17/345,898, filed Jun. 11, 2021, now U.S. Pat. No. 11,692,384, and claims priority therefrom pursuant to 35 USC § 120. The ’898 application claims benefit of provisional application No. 63/102,377, filed Jun. 12, 2020, and claims priority in part therefrom under 35 U.S.C. § 119 (e) therefrom. The ’898 application and '377 provisional application are incorporated by reference herein.

FIELD OF THE INVENTION

The present invention relates to safe, foot operable door openers, to avoid manual hands contact with door handles having unsanitary pathogens thereon. Foot operable implies use of the foot, or use of a cane. The foot operable door opener could also be applied to the hands-free opening of doors, such as warehouse workers, food service wait staff going in and outdoors with heavy trays of food. The foot operable door opener also acts as a door assist for people with week arms.

BACKGROUND OF THE INVENTION

In this era of germs and viruses, door handles can be a constant source of germs and viruses, communicable to the hands of subsequent openers of the door.

Efforts have been made to provide electrically operable door openers, but they are often complex and expensive to install and operate, requiring power, wiring and sensors.

Prior art patents include U.S. Pat. No. 10,081,977 B2 of Shelley, which discloses an automatic electronically and remotely controlled door opening and closing device, using remote controls and a reverse movement rotatable wheel.

Other patents promote a non-motorized cradle for a footwear, such as a shoe or boot, which is attached to a door so that a user has to awkwardly insert the shoe or boot into the door attached, non-moving footwear cradle, where the cradle includes a lower horizontal floor plate and a distal upwardly extending vertical ledge, whereby the user attempts to open the door using only the leverage of the user’s leg, as noted in U.S. Pat. No. 9,115,530 of Michael Sewell. This is not practical since most doors, by design, are equipped with standard overhead closers, or floor closers or spring hinges, which have a 5-10 lbs. of resistance. A force too great to comfortably overcome without mechanical advantage while pivoting on one leg.

The aforementioned patents do not provide simple, cost effective, means of opening a door without using one’s hands, and without an electrical assist or without a footwear cradle, offering no mechanical assistance.

OBJECTS OF THE INVENTION

It is therefore an object of the present invention to provide a simple, cost effective, means of opening a door without using one’s hands, and without an electrical assist.

It is also an object of the present invention to provide a convenient, safe door opener solely using the foot of the user upon a pedal actuator of a door opener.

It is yet another object of the present invention to provide a door opener with a time delay on both the opening and closing cycle of the door opening process, to permit safe egress through the door.

It is a further object to provide a foot operable door opener that can retrofit to any existing door.

Other objects which become apparent from the following description of the present invention.

SUMMARY OF THE INVENTION

In keeping with these objects and others which may become apparent, the present invention is directed to a foot operable door opener, without using one’s hands, and without an electrical assist.

It is to be known in the trade as the SAFETY MAX™ DOOR OPENER.

In this era of germs and viruses, this Invention is a simple, cost effective, means of opening a door without using of one’s hands, and without an electrical assist. The entrance cycle is initiated by stepping on a pedal. This force drives the pedal a ¼ turn, engaging a soft wheel to open the door. The pedal is hard linked to a crank arm which goes into a unidirectional crank shaft hub to turn the wheel. The downward pressure from the pedal pivots a ratcheted hinge connected to a bracketed spring-loaded wheel assembly to keep constant pressure to the ground. A speed increasing gear box or multiple pumps of the pedal turns the wheel system two or more 360 degrees rotations, opening the door sufficiently to allow the entrant to pass. When the foot pedal is dis-engaged by the entrant, this action releases a one way directional mechanical device, such as a ratchet hinge mechanism, or other one way mechanical devices, such as cams, coils, one way threaded devices, slides and ways, or rack and pawl devices, allowing the spring assisted wheel assemble to rotate or slide up, back to its original up position, releasing the wheel from the ground, allowing the door to close with a standard overhead closer or spring-loaded hinge. Now the door is ready for the next entrant.

Models may also include an optional, main spring which can be wound for a further assist to accommodate a delayed action start, where now, a foot switch actuated spring-loaded wheel drops and engages opening cycle as described above. The door which after actuation, will close after a time delay on the retracting spring mechanism, also described above. Both opening and closing are by mechanical advantage, without the use of electric power or motors. This invention is differentiated, unique, novel, and patentable from all prior art, by its’ being a simple machine without electric power, electric motors, scanner or traffic readers of any kind, and through mechanical advantage and a spring loaded hinge assembly to keep constant pressure to the floor plane, hygienically opening doors when safety from disease, virus, bacteria, or other hazards are wished to be avoided or hand operation is not possible as with warehouse or food service, where hands free greatly eases the potential for trip and drop hazards, by the use of an economical apparatus that can be added/or retro fit to any door type, wood, hollow metal, metal-framed glass, all glass, etc. to facilitate ingress and egress passages of all types, locations and environments.

Other alternate embodiments for the foot operable door opener may include an internal latch release mechanism, enabling the door opener to be used on a standard latching door, such as found in most residences.

In a first, preferred embodiment, the foot operable door opener includes a crank assembly including a crank arm, which is rotated from a home position by depression of a foot pedal, with a foot or cane, to rotate a crankshaft 1.3. A drive assembly is connected to the crank arm through the crank shaft for winding one or more main springs.

A gear train with a preselected speed increasing ratio transfers power from the main spring to a drive wheel assembly, which preferably includes a main drive wheel, selected from the group consisting of a mechanical soft, durometer main drive wheel, or a pneumatic main drive wheel connected to a main driveshaft. A traction tension assembly is actuated by the main crankshaft to rotate the main shaft for swinging the door open.

Optionally, a delay assembly is provided for delaying release of potential energy of the main spring to the main drive shaft in order to allow safe ergonomic transfer of an entrant's weight to both feet, which allows the entrant to comfortably step aside to clear swinging of the door.

A return spring is mounted on the aforementioned crank shaft and arm, for returning the crank arm to its home position; and, whereby an entrant is able to open the door without use of hands or electrical assist.

A safety feature is included, whereby the gear train of the door opener includes a clutch bearing allowing for one-way travel of the gear train with no backlash or backward movement.

The gear train preferably has a speed increasing ratio of about 1 to 10.

For safety reasons, the delay assembly of the door opener includes a spring-loaded mechanical, dashpot, or pneumatic cylinder, which is compressed by the main crankshaft when the pedal and crank arm are depressed, so that the pneumatic cylinder has an opening, such as an orifice or an adjustable needle valve to allow air to escape from a compressed chamber in the mechanical or pneumatic cylinder, regulating the delay which releases stored potential from the main springs and which starts a cycle of the main drive wheel turning, without losing any potential energy.

Further with respect to the delay assembly, the aforesaid pneumatic cylinder has a piston and a spring-loaded plunger, where the plunger depresses a pawl, which engages a one way mechanical directional device, such as a ratcheting wheel or socket, which is directly connected to the aforesaid main drive wheel. Other one-way directional devices can be used, such as cams, one way threaded devices, rack and pawl devices. The release of pressure within the cylinder causes the spring-loaded plunger to release the ratchet, and the delay releasing stored potential from the main spring, starts a cycle of the main drive wheel turning, without losing any potential energy.

The traction assembly is also actuated when the crank arm is depressed, which rotates the aforesaid main shaft, causing a depressing arm to pull down a fork assembly, engaging a spring-loaded mechanism held down by a locking pawl, which causes a constant downward pressure for a predetermined length of travel, to accommodate an undercut under said door, threshold, and any slope in front of the door. When an activation pin hits an activation trigger when the aforesaid main springs unwinds at an end of its rotation, the spring-loaded mechanism releases and raises up the locking pawl and the main drive wheel back to a resting position ready fora next cycle.

Afterward, the door closes by itself with the assistance of at least one of standard spring-loaded or gravity hinges, overhead closing mechanisms and floor closing mechanisms, which is standard equipment in all operating entrance doors, or can be added to interior doors not normally equipped therewith.

Optionally, the drive wheel assembly is connected to the crank arm with a set of steel cables wrapped around a drum, whereby when the pedal and crank arm are depressed, the cables turn the drum, winding the main spring. Optionally the main springs are all left-handed or right-handed.

For stability, a chassis is mounted on the door, which houses substantially all operative elements of the door opener.

The present invention also includes in a preferred first embodiment, a method of constructing and using a foot operable door opener comprising the steps of:

a) providing a crank assembly comprising a crank arm rotated from a home position by depression of a foot pedal for rotating a crankshaft;

b) providing a cables assembly connected to said crank arm through said transfer shaft for winding one or more main springs;
providing a drive assembly connected to said transfer shaft connected to said gear train;

c) providing a gear train with a preselected speed increasing ratio for transferring power from the main spring to a drive wheel assembly; whereby the drive wheel assembly comprises a soft, durometer, main drive wheel connected to a main driveshaft;

d) or alternately providing a crank assembly and crank shaft which rotate a gear powertrain with a speed increasing ratio of about 1 to 10 which winds one or more main springs and providing main springs to the drive wheel assembly. whereby the drive wheel assembly comprises a soft, durometer, main drive wheel connected to a main driveshaft;

e) actuating a traction tension assembly by the crankshaft to rotate the drive shaft for swinging the door open;

f) providing a delay assembly for delaying release of potential energy of said main spring to said main drive shaft in order to allow safe ergonomic transfer of an entrant's weight to both feet, allowing said entrant to comfortably step aside to clear swinging of said door;

g) providing a return spring mounted on said crank shaft for returning said crank arm, to its home position;

h) the step of an entrant using said door opener to open said door without use of hands or electrical assist;

i) providing a carriage assembly to house all associated mechanisms and said relationships;

j) providing holes in said carriage to facilitate the securing of said door opening to new or existing doors;

k) providing clamping sub plate mounting system which wraps around bottom and edge of door to facilitate the installation of said opener on any door without penetrating, drilling holes, or doing any damage to existing glass, metal, wood, or fiberglass doors.

l) provide ergonomic cover to protect said door opener from weather, dirt, and environmental conditions; and, m) providing said cover to protect, guard and deflect pedestrians from being entangled or tripping on said door opener.

The method of opening a foot openable door opener without an electric assist further includes the optional step of providing the gear train including a clutch bearing allowing for one-way travel of the gear train with no backlash or backward movement.

Preferably the said gear train has a speed increasing ratio of about 1 to 10.

The method also includes the step of the delay assembly having a spring-loaded mechanical or pneumatic cylinder, which is compressed by the main crankshaft when the pedal and crank arm are depressed, and wherein the mechanical or pneumatic cylinder has an opening, such as a fixed orifice or adjustable needle valve, for allowing air to escape from a compressed chamber in the pneumatic cylinder or dashpot, whereby regulating the delay releases stored potential from the main springs and starts a cycle of the main drive wheel turning without losing any potential energy.

Alternately the method optionally includes a friction clutch to restrain said drive wheel for a fixed or variable length of time, or a dampener, such as a dash pot cylinder to mechanically regulate spring-loaded plunger depresses a pawl which engages a ratcheting wheel, which itself is directly connected to the aforesaid main drive wheel, whereby release of pressure within the cylinder causes the spring-loaded plunger to release the ratchet, and the delay releases stored potential from the main spring and starts a cycle of the main drive wheel turning without losing any potential energy.

The method further includes the mechanical or pneumatic cylinder having a piston and a spring-loaded plunger, where the spring-loaded plunger depresses a pawl which engages a ratcheting wheel, which itself is directly connected to the aforesaid main drive wheel, whereby release of pressure within the cylinder causes the spring-loaded plunger to release the ratchet, and the delay releases stored potential from the main spring and starts a cycle of the main drive wheel turning without losing any potential energy.

Optionally the method further includes the mechanical or dashpot cylinder having a piston and a spring-loaded plunger, where the spring-loaded plunger depresses a pawl which engages a ratcheting wheel, which itself is directly connected to the aforesaid main drive wheel, whereby release of pressure within the cylinder causes the spring-loaded plunger to release the ratchet, and the delay releases stored potential from the main spring and starts a cycle of the main drive wheel turning without losing any potential energy.

Optionally, the method also includes the step in which the traction assembly is also actuated when the crank arm is depressed, rotating the crankshaft, which causes a depressing arm to pull down a bracket arm, engaging a spring-loaded mechanism held down by a locking pawl, causing a constant downward pressure for a predetermined length of travel, to accommodate an undercut under the door, threshold, and any slope in front of the door.

The method of opening the foot operable door opener further includes the step of having an activation pin hit an activation trigger when the main springs unwind at an end of its rotation, thereby releasing the locking pawl closing the spring-loaded mechanism, to raise up the main drive wheel 5.1 back to a resting position and ready for a next cycle.

Optionally the method also includes a time delay for the raising of the main drive wheel back to its original position for a prescribed length or variable length of time before lifting main drive wheel 5.1 back, to a resting position, and ready for a next cycle.

The method also includes the step of connecting the drive wheel assembly to the gear train which connects to the transfer shaft where the crank arm with a set of steel cables wrapped around a drum, whereby when the pedal and crank arm are depressed, the cables turn the drum and transfer shaft, winding the main spring.

Optionally, the main springs are all left-handed and right-handed.

Furthermore, when a chassis is mounted on the door, it houses substantially all operative elements of the foot operable door opener.

In a second embodiment, a foot operable door opener operates by user exertion of force against a pedal attached to a crank arm and shaft, where a transfer shaft works with a transfer arm and a drive pawl, and with right handed main springs as a drive assembly, mounted on a main chassis with attachments, such as chassis mounting holes and screws or a clamping sub plate. A gear train of this second embodiment includes a main gear, with a clutch bearing, an idler increasing gear and an idler shaft, as well as with a secondary speed increasing gear, a shaft, a drive gear driving a drive shaft with associated transfer gears, communicating with a drive wheel. A traction/tension carriage assembly regulates adhesive or slippage and coefficient of friction of the various components on surfaces upon which they move, including a bracket arm, an actuating arm, a connecting arm, a carriage depressing arm, a hinge pin, a tension arm with a tension arm roller. A traction spring is provided, along with a trigger actuator pin, to insure smooth opening and closing of the door, with a delay by way of a friction slip clutch between the drive wheel and the drive shaft.

In a third embodiment, a non-motorized foot operable door opener with a drive train, preferably a planetary gear assembly, is initiated in an entrance cycle by the user stepping on a pedal This force exerted on the pedal drives the crank arm, a sixty to ninety (60-90) degree turn, engaging a soft wheel, to open the door D. A speed increasing planetary gear box, winds one or more springs, (right and left-handed) thereby opening the door, sufficiently to allow the entrant to pass until the foot pedal, is dis-engaged by the entrant. The crank arm is returned to its original position, with the aid of the return arm spring. This action causes the crank arm, to strike the trigger lever release, which in turn releases the ratcheting hinge mechanism and spring, allowing the wheel return lifting springs, to lift the wheel assembly to rotate up, back to its original up position, guided by the guide pin and stop. This disengages the wheel, from the ground, thus allowing the door to close with a standard overhead closer or spring-loaded hinge, which is standard hardware on most doors. At that time after the opening and closing of the door, the door is ready for the next entrant.

BRIEF DESCRIPTION OF THE DRAWINGS

The present invention can best be understood in connection with the accompanying drawings. It is noted that the invention is not limited to the precise embodiments shown in the following drawings, in which:

FIGS. 5A, 5B and 6 show details of the environment in which the foot operable door opener is utilized, wherein:

FIG. 5A shows a pedestrian approaching a door having a foot operable door opener, including a foot contactable pedal attached to a crank arm, whereby a housing encloses the internal components of the foot operable door opener; and, FIG. 5B is a close-up detail view of the pedestrian's foot approaching the pedal 1.1 mounted upon crank arm, and the housing mounted on the ground "G" in the vicinity of door "D"; and, FIG. 6 is a close-up detail view of the wordless instructional logo.

LIST OF REFERENCE NUMERALS

Figure 1:
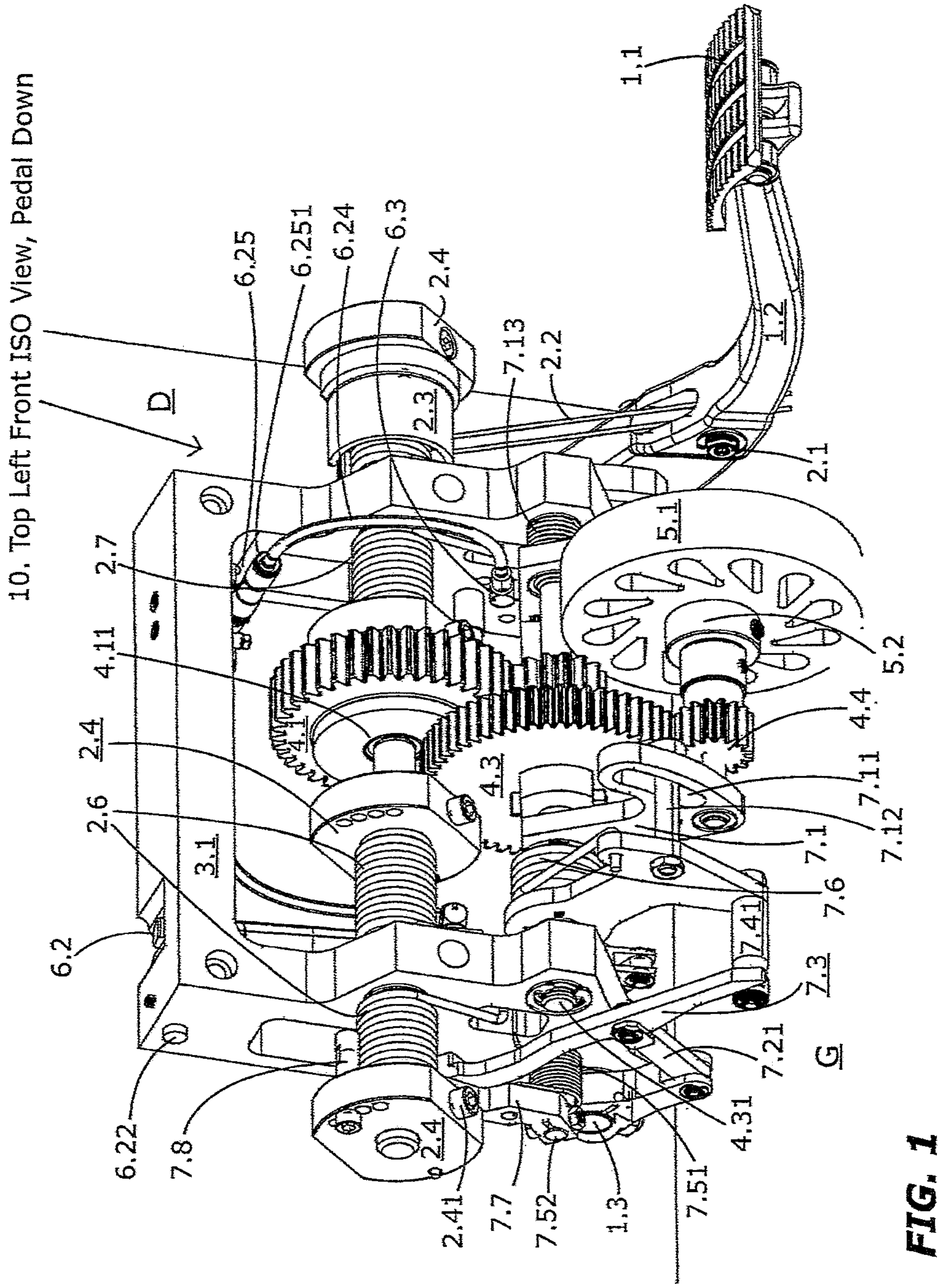
FIG. 1 is a top left front isometric view, shown with the foot pedal down.
Figure 2:
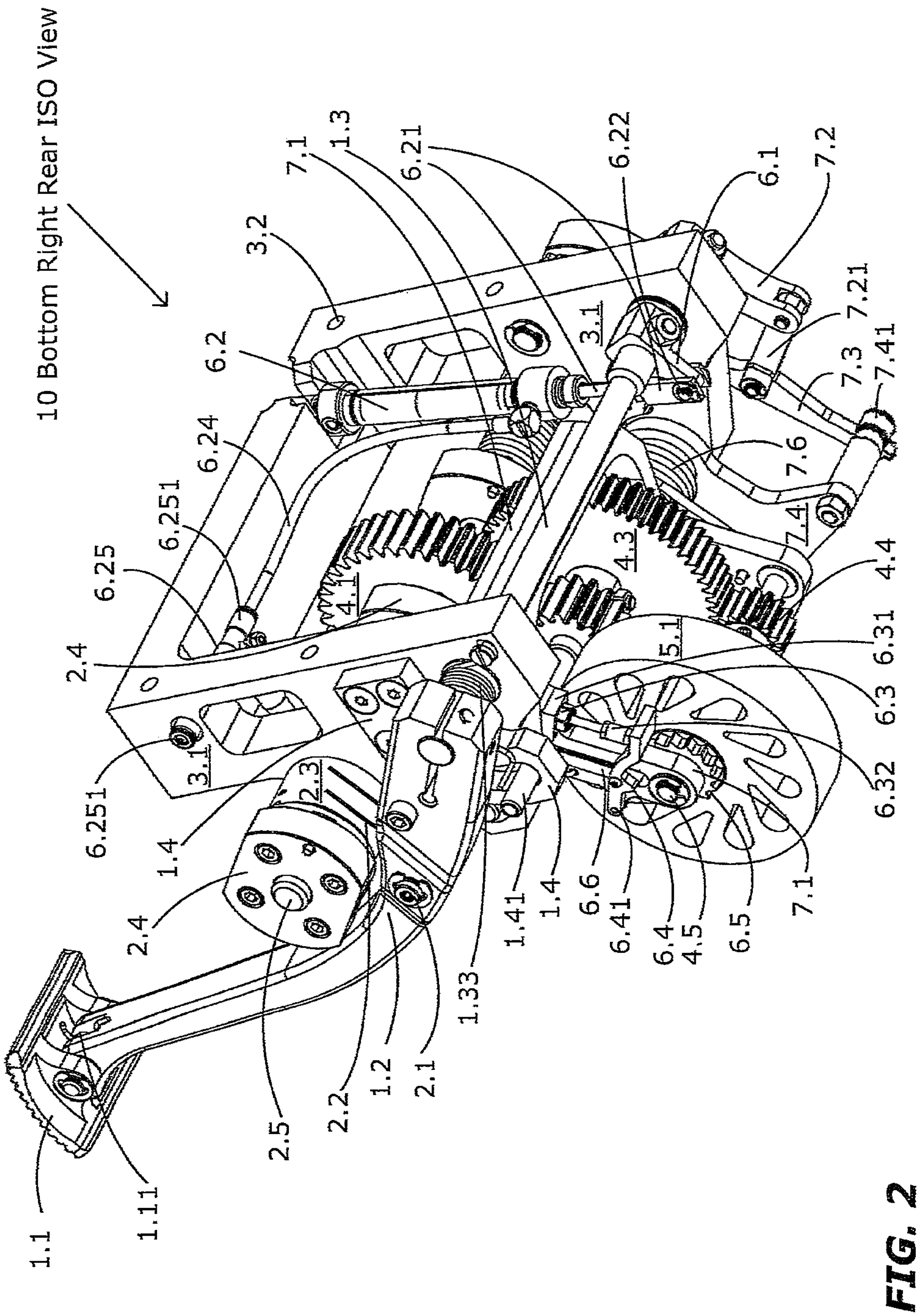
FIG. 2 is a bottom right rear isometric view, with the door and floor removed, and the pedal shown in an up position.
Figure 3:
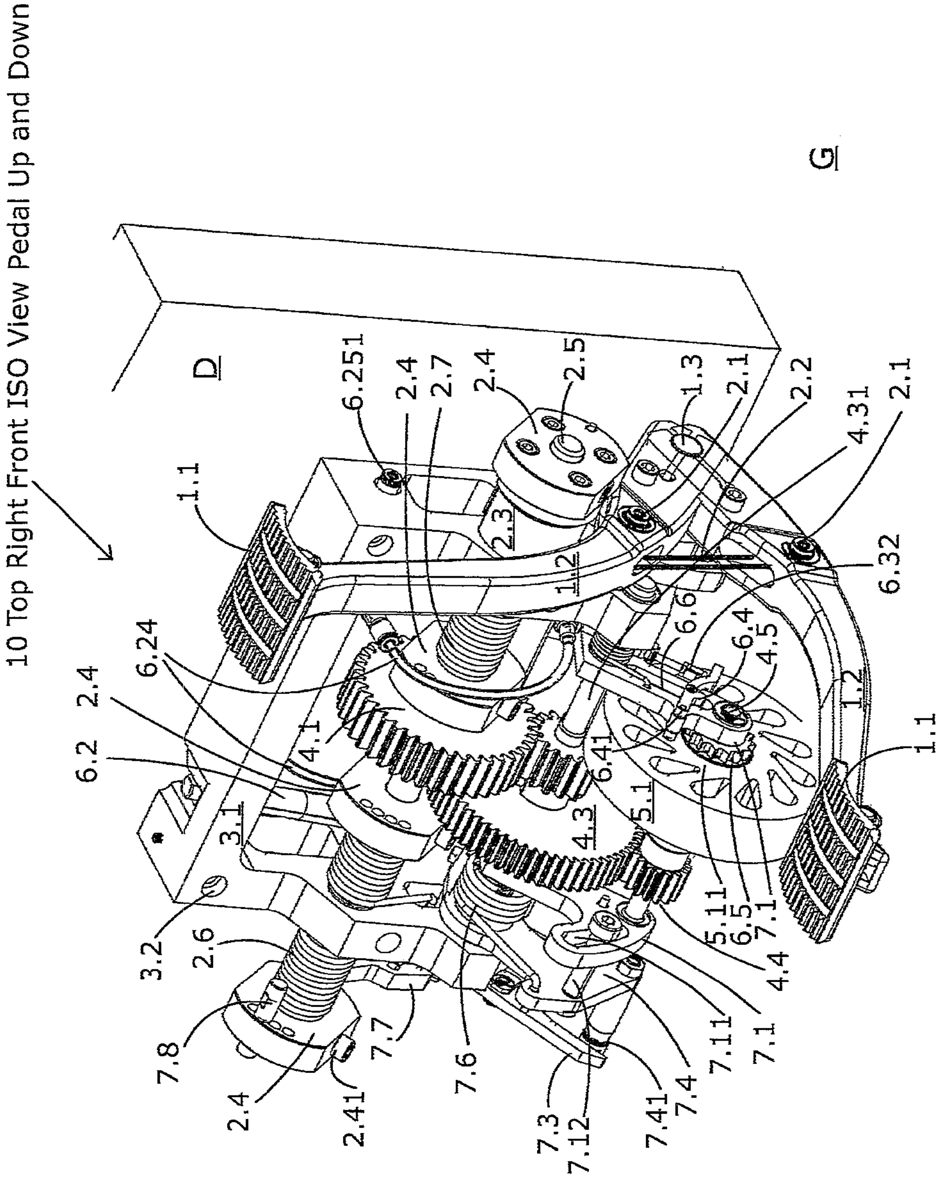
FIG. 3 is a top right front isometric view, shown with the foot pedal up and down.

FIGS. 1-6
1.0 CRANK ASSEMBLY
Numeral Description
1.0 Foot Activation
1.1 Pedal
1.11 Pedal spring
1.2 Crank arm
1.3 Crank shaft
1.31 Crank pin
1.32 Bushing
1.33 Arm return spring
1.331 Retaining screw
1.4 Arm guide bracket and stop
1.41 Guide pin
2.0 DRIVE ASSEMBLY
Numeral Description
2.1 Cable termination pin
2.11 "e" clip ring
2.2 Transfer cable
2.3 Cable drum
2.4 Termination/tensioning hub
2.41 Tensioner locking screw
20 2.5 Transfer shaft
2.6 Main springs, right-handed
2.7 Main springs, left-handed
2.8 Tension locking screw
25 3.0 CHASSIS
Numeral Description
3.1 Main chassis
3.2 Chassis mounting holes and screws
30 4.0 GEAR TRAIN
Numeral Description
4.1 Main gear with clutch bearing
4.11 clutch bearing
4.2 Idler increasing gear
5 4.21 Idler shaft
4.3 Secondary speed increasing gear
431 Shaft
4.4 Drive gear

4.5 Drive shaft
4.51 Bushing
4.52 E clip
5.0 DRIVE WHEEL ASSEMBLY
Numeral Description
5.1 Drive wheel
5.11 Drive wheel bearing
5.2 Wheel hub
6.0 DELAY ASSEMBLY
Numeral Description
6.1 Spring-loaded Pneumatic cylinder compressing arm
6.11 Locking pin
6.2 Pneumatic double acting cylinder with spring return
6.21 Cylinder shaft and clevis
6.22 Clevis pin
6.23 E clip
6.24 Air line
6.25 Valve assembly
6.251 Check valve
6.252 Orifice restrictor
6.3 Single acting pin cylinder
6.31 Block
6.32 Plunger
6.4 Pawl
5 6.41 Hinge pin
6.5 Rachet wheel
6.6 Return spring
7.0 TRACTION/TENSION CARRIAGE ASSEMBLY
Numeral Description
7.1 Fork assembly
7.11 Guide
7.12 Guide pin and stop
7.13 Fork assembly lifting spring
7.2 Actuating arm
7.21 Connecting link
7.3 Carriage depressing arm
7.31 Hinge pin
7.4 Tension arm
7.41 Tension arm roller
7.5 Traction locking pawl
7.51 Traction pawl spring
7.52 Pawl actuator shaft
7.6 Traction spring
7.7 Trigger lever
7.8 Trigger actuator pin
10 Safety Max door opener
30 12 Unit cover
13 Instructional signage graphic
D Door
G Ground
FIGS. 7-9
31.0 CRANK ASSEMBLY
Numeral Description
31.0 Foot activation
31.1 Pedal
31.2 Crank arm
31.3 Crank shaft
32.0 DRIVE ASSEMBLY
Numeral Description
32.2 Transfer arm
32.3 Drive pawl
32.5 Transfer shaft
32.6 Main springs, right-handed
20
33.0 CHASSIS
Numeral Description
33.1 Main chassis

33.2 Chaise mounting holes and screws
34.0 GEAR TRAIN
Numeral Description
34.1 Main Gear
34A1 Clutch bearing
30 34.2 Idler increasing gear
34.21 Idler shaft
34.3 Secondary speed increasing gear
34.31 Shaft
34.4 Drive gear
34.5 Drive shaft
34.6 Transfer gears
35.0 DRIVE WHEEL ASSEMBLY
Numeral Description
35.1 Drive wheel
36.0 DELAY ASSEMBLY
36.1 Friction plate and clutch assembly
37.0 TRACTION/TENSION CARRIAGE ASSEMBLY
Numeral Description
37.1 Bracket arm
37.2 Actuating arm
37.21 Connecting arm
37.3 Carriage depressing arm
37.31 Hinge pin
37.4 Tension arm
37.41 Tension arm roller
37.6 Traction spring
37.8 Trigger actuator pin
310 Safety Max™ door opener
D Door
G Ground
30
FIGS. 10-12
51.0 CRANK ASSEMBLY
Numeral Description
51.0 Foot activation
51.1 Pedal
51.2 Crank arm
51.3 Crank shaft
51.32 Bushing
51.33 Arm return spring
52.0 DRIVE ASSEMBLY
(Spring-loaded)
Numeral Description
52.6 Main springs, right-handed
52.7 Main springs, left-handed
53.0 CHASSIS
Numeral Description
20 53.1 Main chaise
53.2 Chassis mounting holes and screws
54.0 GEAR TRAIN
Numeral Description
54.1 Planetary gear assembly
54.11 Clutching bearing
54.5 Drive shaft
54.51 Bushing
55.0 DRIVE WHEEL ASSEMBLY
Numeral Description
55.1 Drive wheel
56.0 DELAY ASSEMBLY
18
57.0 TRACTION/TENSION CARRIAGE ASSEMBLY
Numeral Description
57.1 Bracket arm
57.11 Guide
57.12 Guide pin and stop
57.31 Hinge pin
57.5 Traction locking ratchet and hinge
57.6 Traction spring
57.7 Trigger lever
57.8 Wheel return lifting springs
510 Safety Max™ door opener
D Door
G Ground

DETAILED DESCRIPTION OF THE DRAWINGS

The present invention has broad applications to many technical fields for a variety of articles. For illustrative purposes only, a preferred mode for carrying out the invention is described herein, wherein a foot operable door opener is provided without an electrical assist.

In a first embodiment, shown in drawing FIGS. 1-6, the foot operable door opener of this invention has a pedal that is convenient for the user. Exposure to hand operable unsanitary hand operable door handles is minimized and for hands free door operation when moving through door portals when hands are occupied.

The current configuration of the first embodiment of the door opener is divided into seven distinct operational segments. The first segment is the crank assembly, 1.0. The cycle is initiated when the pedal 1.1 is depressed which moves the crank arm, 1.2, down transferring the torque to the crankshaft, 1.3. The crank arm returns back to the home position with the assistance of the return spring, 1.33.

The next segment is the drive assembly, 2.0. The drive assembly is connected to the crank arm with a set of steel cables, 2.2. The cables are wrapped around the drum, 2.3, when the pedal and crank arm are depressed, the cables, turn the drum, winding up the main springs, 2.6, 2.7. In the current configuration, the springs are both left-handed and right-handed, ganged up on the main shaft, 2.5, to generate the torque required to turn the wheel, 5.1 via gear train 4.0.

The chassis, 3.1, houses all the different mechanisms and bushings within the chassis. It is also accommodates the means of securing the chassis with fasteners, such as screws or clamps, to the door.

The gear train, 4.0. has a speed increasing ratio of 1 to 10. The 60 degree turn on the crank arm, 1.2, will translate to 4.5 revolutions of the 4-inch wheel, 5.1. This is enough to open the door 25 to 30 inches. The main springs, 2.6, 2.7, drive the primary gear, 4.1, which has a one-way clutch bearing, 4.11, centered around the shaft, 2.5. This allows for the one-way travel of the gear with no backlash or backward movement. The large main gear is meshed with the small idler gear, 4.2, which is connected with gear, 4.3 via axle 4.31. The gear 4.3 is meshed with drive gear, 4.4. The drive gear 4.4 is mounted on the same shaft, 4.5, as the drive wheel, 5.1. The drive train transmits rotation of the transfer shaft 2.5 to driveshaft 4.5 with ratio 1:10 in the same rotational direction.

The drive wheel assembly, 5.0, consists of a drive wheel, such as, for example, a soft durometer wheel connected to the main driveshaft, 4.5, or a pneumatic main drive wheel, through a hub, 5.2. The energy stored in wound-up torsion springs 2.6 and 2.7 is transmitted via gear train to drive wheel 5.1. The drive wheel 5.1 is temporarily locked by delay system to allow a safe time delay, such as about 3 to 5 seconds, for the wheel 5.1 to start rotating.

The delay system, 6.0, holds and delays the release of the energy of the wound springs 2.6 and 2.7. This allows safe ergonomic transfer of one's weight to both feet. This unique feature enables one's weight to be planted back on the ground. This allows the entrant to comfortably step aside to clear the swinging door.

The delay assembly 6.0 consists of a double-acting pneumatic cylinder, with spring return, 6.2. The cylinder 6.2 is compressed by means of the main crankshaft, 1.3, when the pedal, 1.1 and crank arm, 1.2, are depressed. Cylinder, 6.2, through plastic tubes, 6.24 and check valves, 6.251, pressurizing the system to a single acting pin cylinder, 6.3, extending a plunger, 6.32. This plunger depresses a pawl, 6.4, which engages and locks a ratchet wheel, 6.5, which is directly connected to the main drive wheel 5.1. Air escapes from the compressed chamber of the single-acting pin cylinder, 6.2, through fixed orifice restrictor, 6.252, or needle valve, regulating the delay. As the pressure is released through the orifice, the spring loaded plunger, 6.32, retracts releasing the pawl, 6.4, with the aid of a tension spring, 6.6, allowing the pawl 6.4, to release the ratchet, 6.5, on the main wheel, 5.1. This delay releases the stored energy of the wound-up torsion springs without losing any energy and frees rotation of the drive wheel 5.1.

The traction tension assembly, 7.0, is actuated when the main pedal crank arm, 1.2, is depressed. This rotates the crankshaft, 1.3, which is connected to the actuating arm, 7.2, which pulls down the carriage depressing arm, 7.3. through the connecting link, 7.21, The depressing arm, 7.3, pulls down the tension arm, 7.4, through tension arm roller, 7.41, which falls into a notch and is locked into place with the traction locking pawl, 7.5, assisted with traction pawl spring, 7.51, which maintains continuous light torque that keeps traction locking pawl in contact with round part of the tension arm 7.4. The depressing arm, 7.3, pulls down and engages the pre-loaded fork assembly, 7.1, through guide pin and stop 7.12. moving the drive wheel, 5.1 towards the ground. The Traction spring, 7.6, keeps constant downward pressure and develops positive force to the ground to maintain traction throughout the one- and one-half inches of travel, 7.11. This is to accommodate: the undercut under a door, threshold, and any slope in the travel path of the opening door.

As the main springs, 2.6, 2.7, unwinds at the end of the cycle, an actuating pin 7.8 hits the trigger lever 7.7 and lifts the locking pawl 7.5 through pawl actuator shaft 7.52, releasing the fork assembly with the assistance of the fork assembly lifting spring, 7.13. This raises up the main drive wheel, 5.1, back to the resting position where it is ready for the next cycle.

Figure 4:
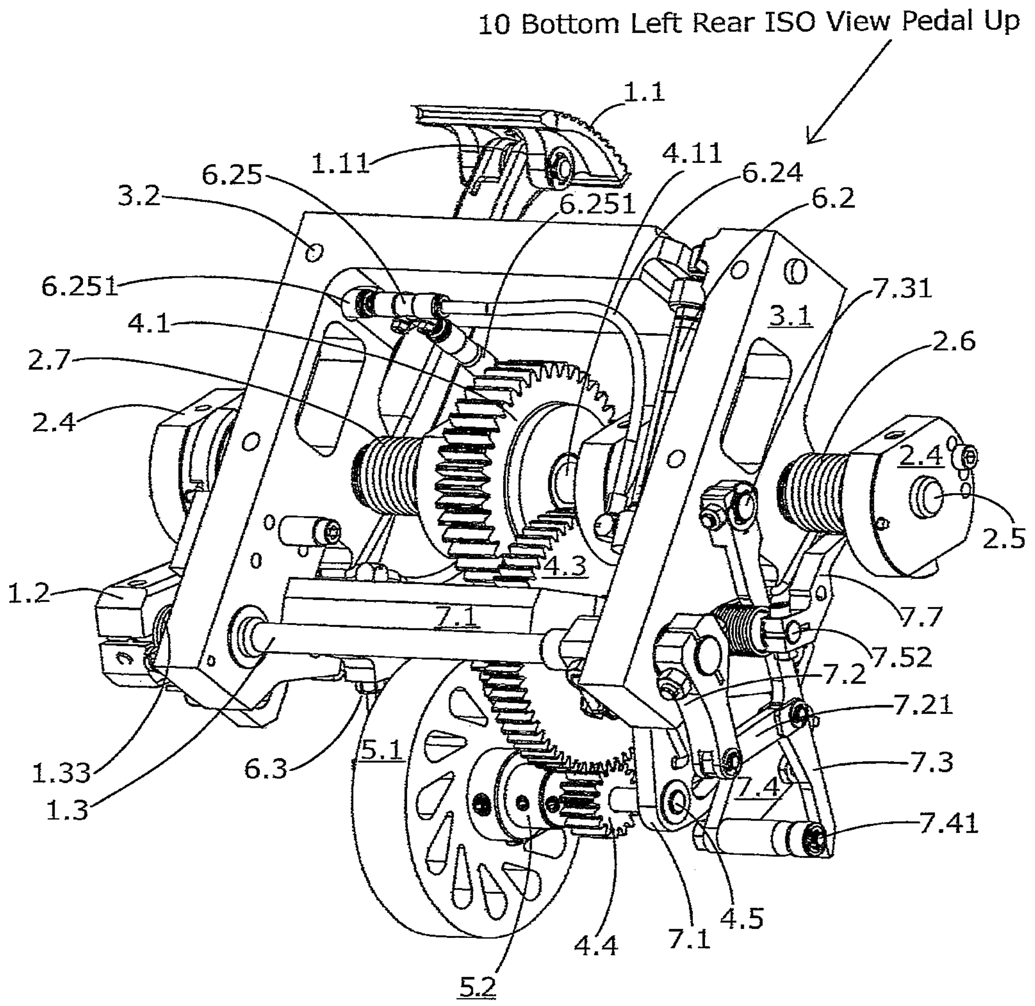
FIG. 4 is a bottom left, rear isometric view, shown with the door and floor removed, and the foot pedal in a up position.
Figure 4A:
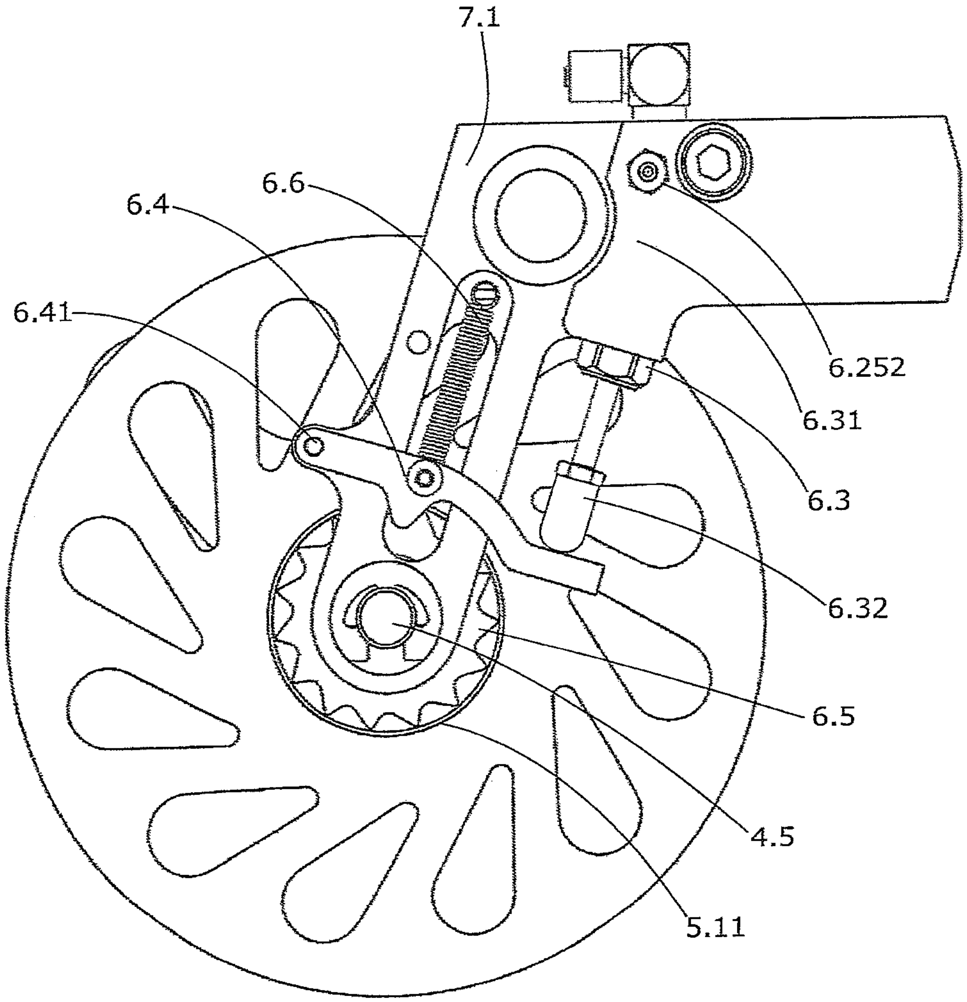
FIG. 4A is a detail section view of the main drive wheel, 5.1, delay system.
Figure 4B:
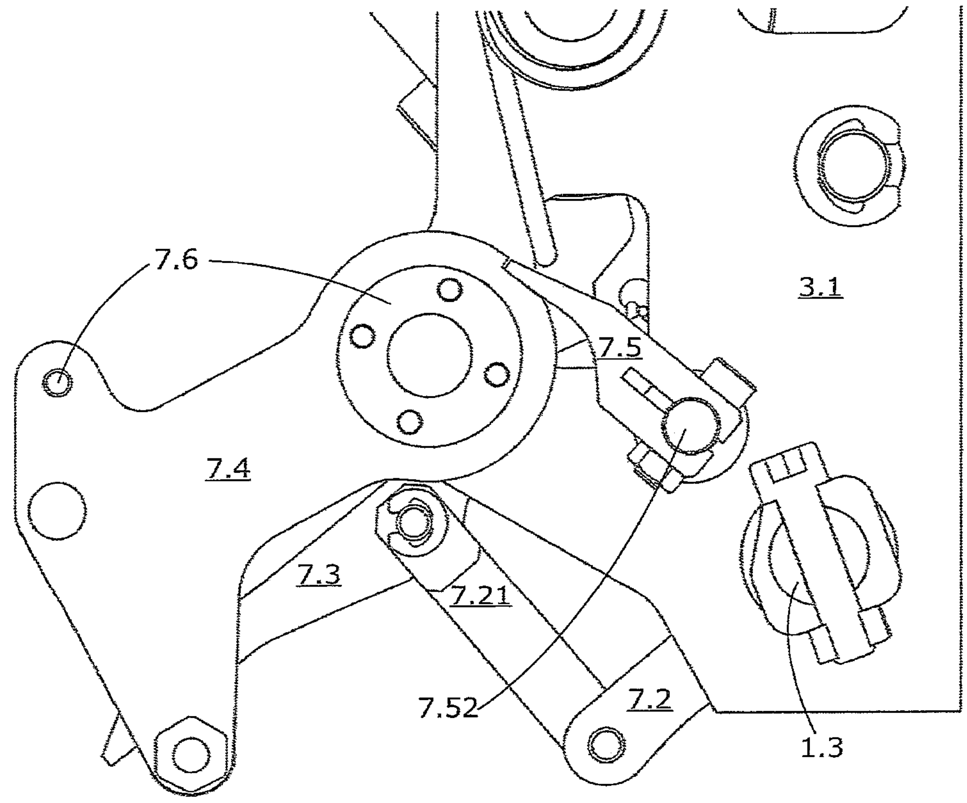
FIG. 4B is a detail section view of the traction carriage assembly.
Figure 4C:
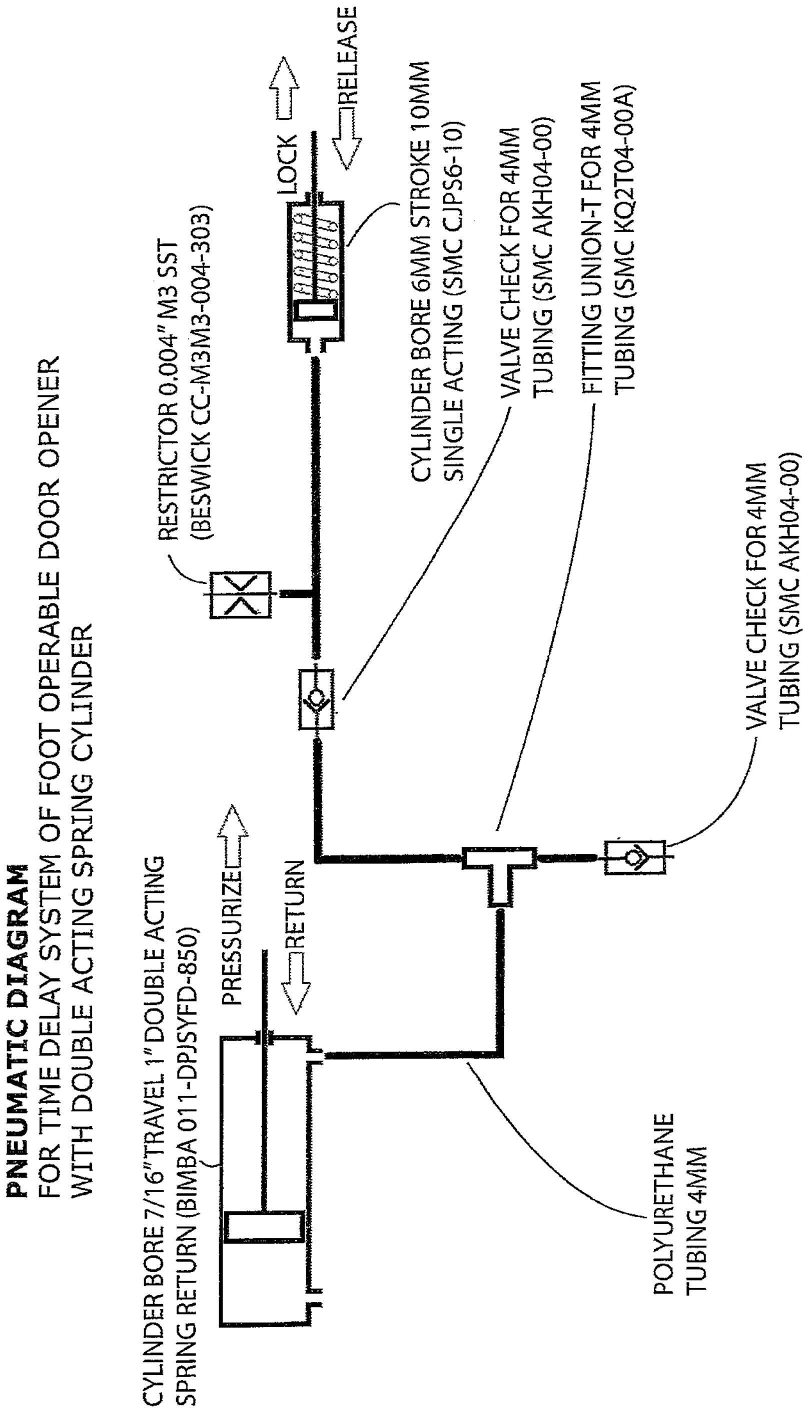
FIG. 4C is a diagrammatic block drawing of the pneumatic delay system.
Figure 4D:
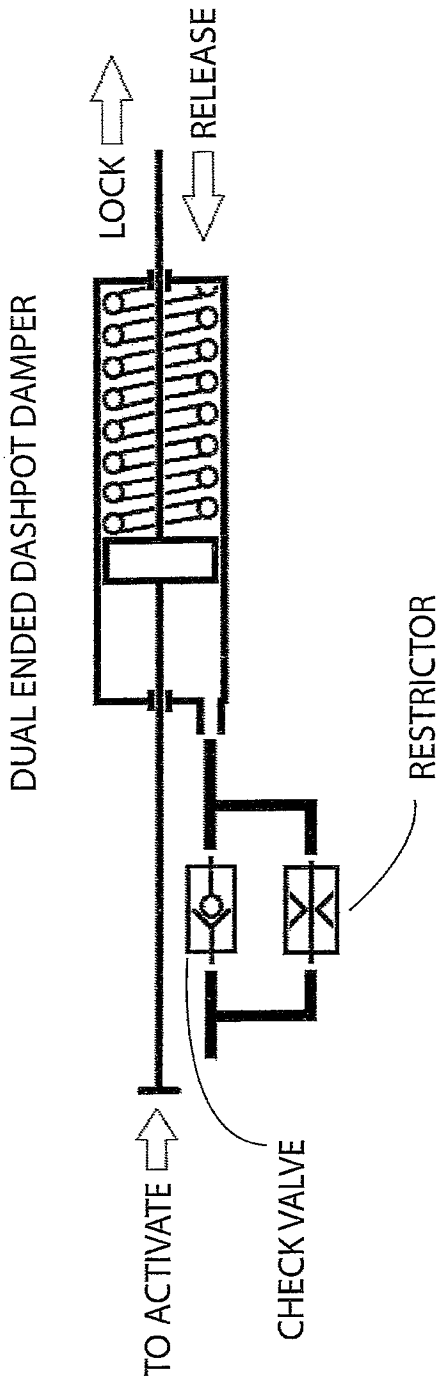
FIG. 4D is a diagrammatic block drawing of the dashpot delay system.
Figure 4E:
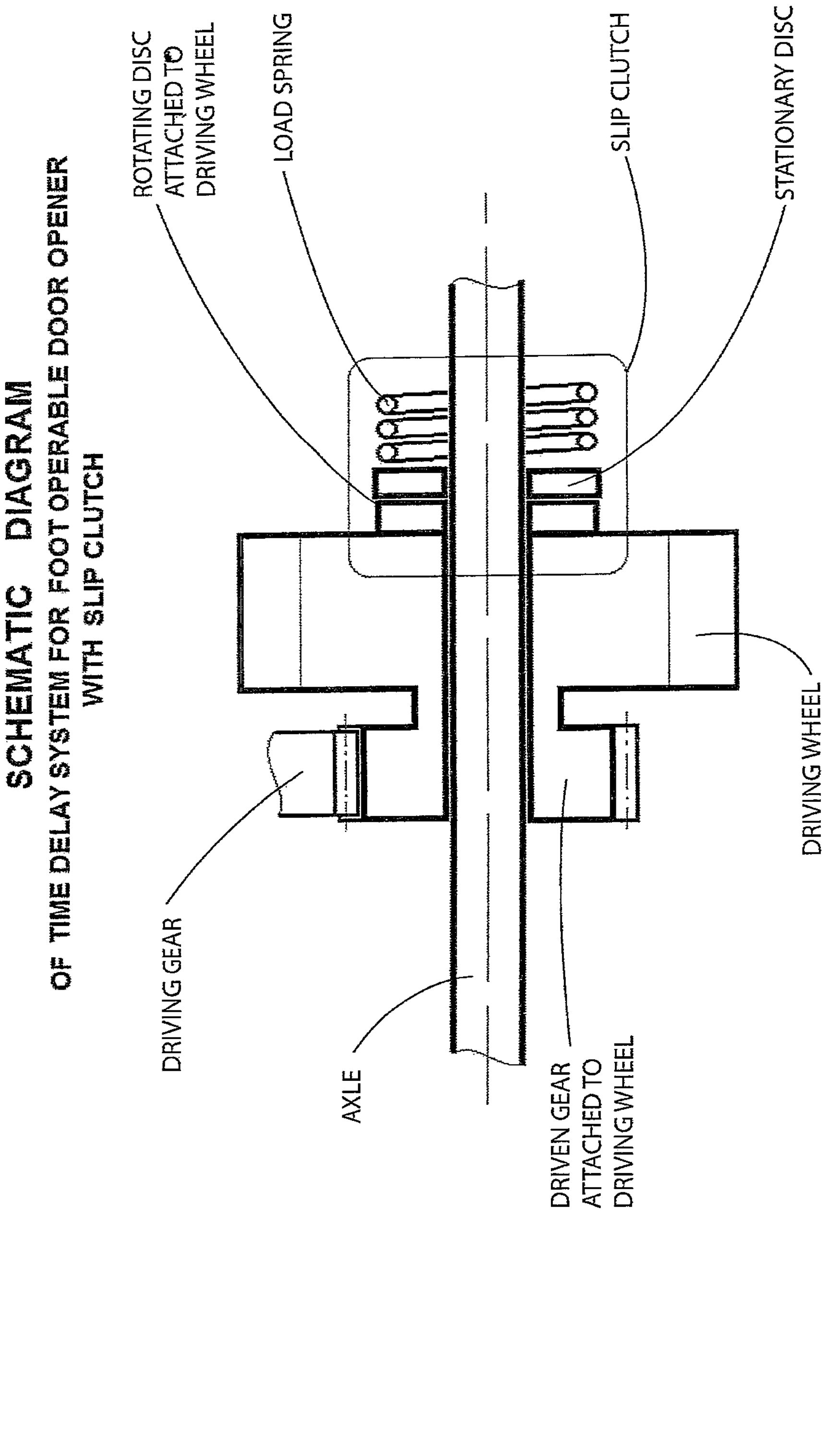
FIG. 4E is a diagrammatic block drawing of the slip clutch delay system.

FIGS. 4A, 4B, show section details of the mechanisms which are difficult to see in the isometric views. FIGS. 4C, 4D and 4E show optional systems with diagrammatic drawings.

FIG. 4A is a section close-up detail view of a wheel delay assembly. For example, as noted above, the delay assembly 6.0 consists of a double-acting pneumatic cylinder, with spring return, 6.2. The cylinder 6.2 is compressed by means of the main crankshaft, 1.3, when the pedal, 1.1 and crank arm, 1.2, are depressed. Cylinder, 6.2, through plastic tubes, 6.24 and check valves, 6.251, pressurizing the system to a single acting pin cylinder, 6.3, extending a plunger, 6.32. This plunger depresses a pawl, 6.4, which engages and locks a ratchet wheel, 6.5, which is directly connected to the main drive wheel 5.1. Air escapes from the compressed chamber of the single-acting pin cylinder, 6.2, through fixed orifice restrictor, 6.252, or needle valve, regulating the delay. As the pressure is released through the orifice, the spring loaded plunger, 6.32, retracts releasing the pawl, 6.4, with the aid of a tension spring, 6.6, allowing the pawl 6.4, to release the ratchet, 6.5, on the main wheel, 5.1. This delay releases the stored energy of the wound-up torsion springs without losing any energy and frees rotation of the drive wheel 5.1.

FIG. 4B is a section close-up detail view of traction/tension carriage assembly. For example, as noted above, the traction tension assembly, 7.0, is actuated when the main pedal crank arm, 1.2, is depressed. This rotates the crankshaft, 1.3, which is connected to the actuating arm, 7.2, which pulls down the carriage depressing arm, 7.3. through the connecting link, 7.21, The depressing arm, 7.3, pulls down the tension arm, 7.4, through tension arm roller, 7.41, which falls into a notch and is locked into place with the traction locking pawl, 7.5, assisted with traction pawl spring, 7.51, which maintains continuous light torque that keeps traction locking pawl in contact with round part of the tension arm 7.4. The depressing arm, 7.3, pulls down and engages the pre-loaded fork assembly, 7.1, through guide pin and stop 7.12. moving the drive wheel, 5.1 towards the ground. The Traction spring, 7.6, keeps constant downward pressure and develops positive force to the ground to maintain traction throughout the one- and one-half inches of travel, 7.11. This is to accommodate: the undercut under a door, threshold, and any slope in the travel path of the opening door.

As the main springs, 2.6, 2.7, unwinds at the end of the cycle, an actuating pin 7.8 hits the trigger lever 7.7 and lifts the locking pawl 7.5 through pawl actuator shaft 7.52, releasing the fork assembly with the assistance of the fork assembly lifting spring, 7.13. This raises up the main drive wheel, 5.1, back to the resting position where it is ready for the next cycle.

FIG. 4C is a diagrammatic drawing of the optional pneumatic delay system. When the double acting cylinder is activated by the crank shaft 1.3, to pressurizes the system, with the aid of the check valves. The valves allow the pressure to build up in single acting pin cylinder, engaging the plunger. The second check valve in line from the primary cylinder maintains the seal and pressure at the pin cylinder. The orifice restrictor or needle valve relieves the pressure at a controlled rate which delays the release of the drive wheel. The first check valve in line relieves the pressure in the primary cylinder, so it has an unimpeded backstroke, so it is ready to charge the system with the next depression of the pedal.

This could also serve as a delay for the engagement of the traction release mechanism, 7.0, providing another delay option for holding the door open delaying the closing cycle with a fixed or variable time interval.

FIG. 4D is a diagrammatic drawing of an optional dashpot delay system. This mechanism can be used in conjunction with the pneumatic system in 4C or as a standalone system which is physically activated by mechanical means' The spring-loaded dashpot cylinder in conjunction with the restrictor or needle valve allows for the controlled release of the plunger equating into the time delay for the start of the drive wheel engagement.

This could also serve as a delay for the engagement of the traction release mechanism, 7.0, providing another delay option for holding the door open delaying the closing cycle with a fixed or variable time interval.

FIG. 4E is a diagrammatic drawing of a optional friction slip clutch delay system. A stationary fixed to the axle disc, engages a rotating disc, which is attached to the drive wheel. The two discs are allowed to slip a prescribed number of degrees until they mechanically engage and lock into each other. The time delay is adjusted by varying the tension applied to the load spring with a tensioning nut. This varies the duration of the slippage until the two surfaces mechanically engage.

This could also serve as a delay for the engagement of the traction release mechanism, providing another delay option for when the closing cycle would begin.

Figure 5A:
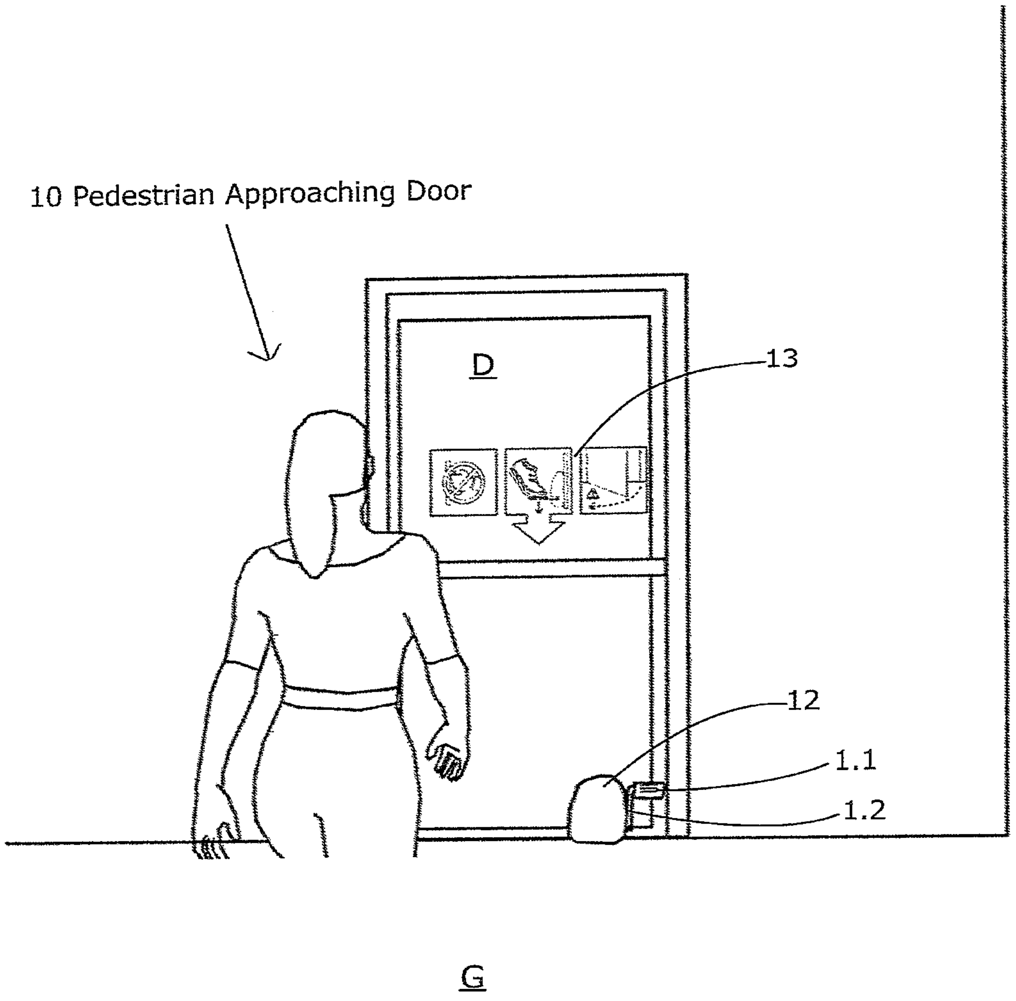
Figure 5B:
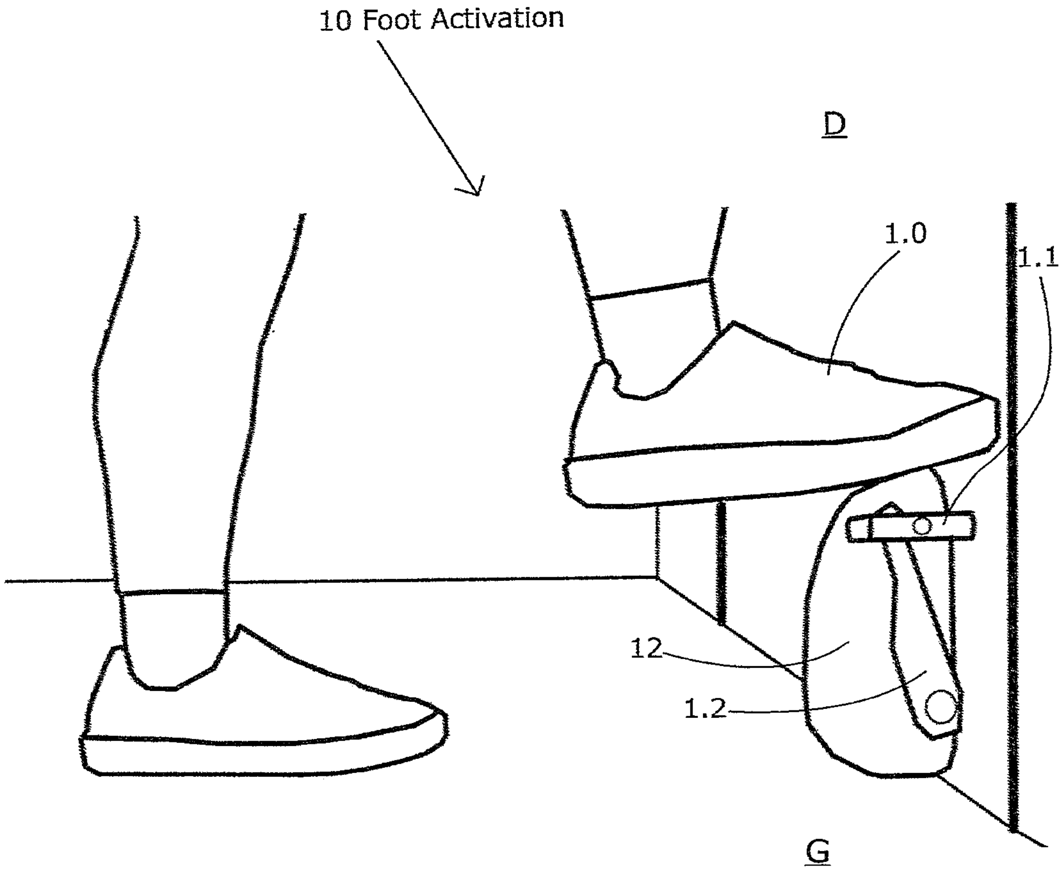
Figure 6:
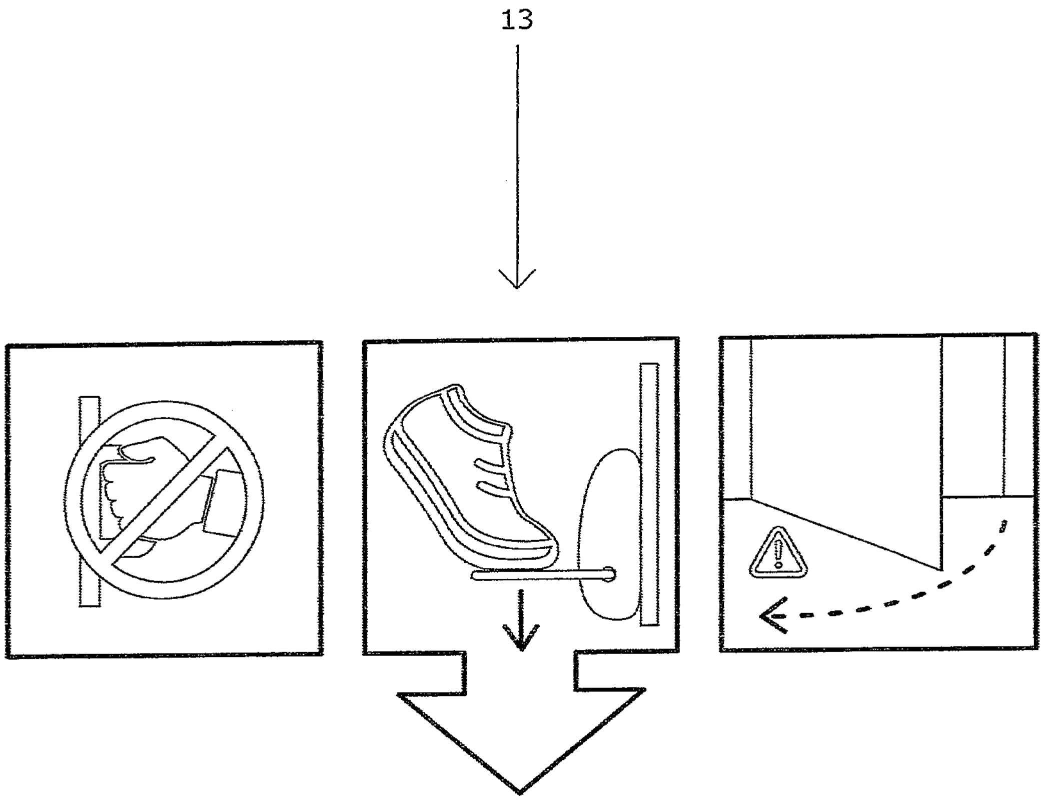

FIGS. 5A, 5B and 6 show details of the environment in which the foot operable door opener is utilized.

For example, FIG. 5A shows a pedestrian approaching a door "D" having a foot operable door opener 10, including s foot contactable pedal 1.1 attached to a crank arm 1.2, whereby a housing 12 encloses the internal components of the foot operable door opener 10. FIG. 5A also shows a wordless instructional logo 13 displayed upon the surface of the door or any suitable visually perceptible surface in the vicinity of the door. The logo preferably has a triptych of three images, including the diagonal "NO" sign through a picture of a user's hand holding a door handle, a close-up detail view of the pedestrian's foot contacting the pedal 1.1, and an image of the door shown being opened in the direction of the curved arrow depicted, noting caution to be exercised in the path of the swinging door.

FIG. 5B is a close-up detail view of the pedestrian's foot approaching the pedal 1.1 mounted upon crank arm 1.2, and the housing 12 mounted on the ground "G" in the vicinity of door "D".

FIG. 6, is a close-up detail view of the wordless instructional logo 13.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

Figure 7:
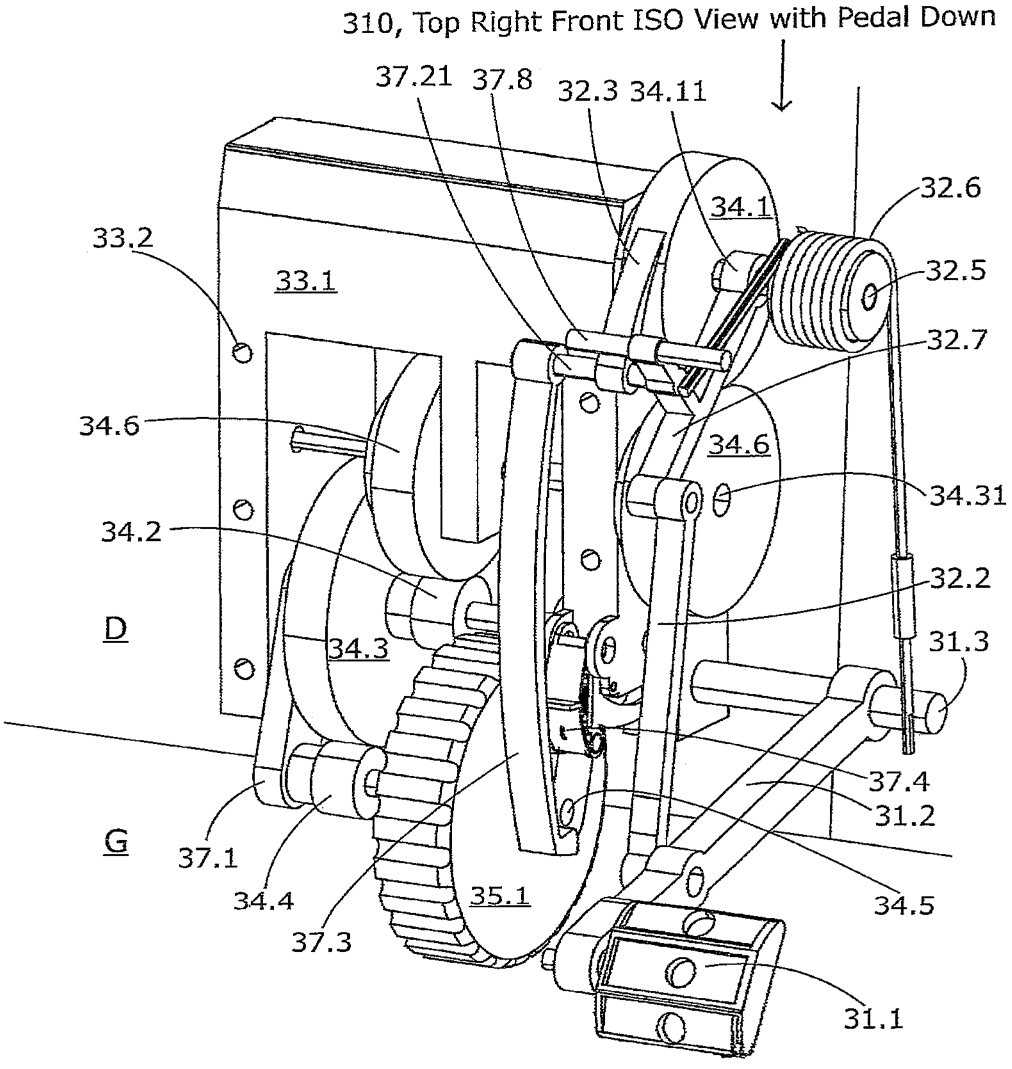
FIG. 7 is a top, right front isometric view of a second embodiment of the door opener, shown with the foot operable pedal in a down position.
Figure 8:
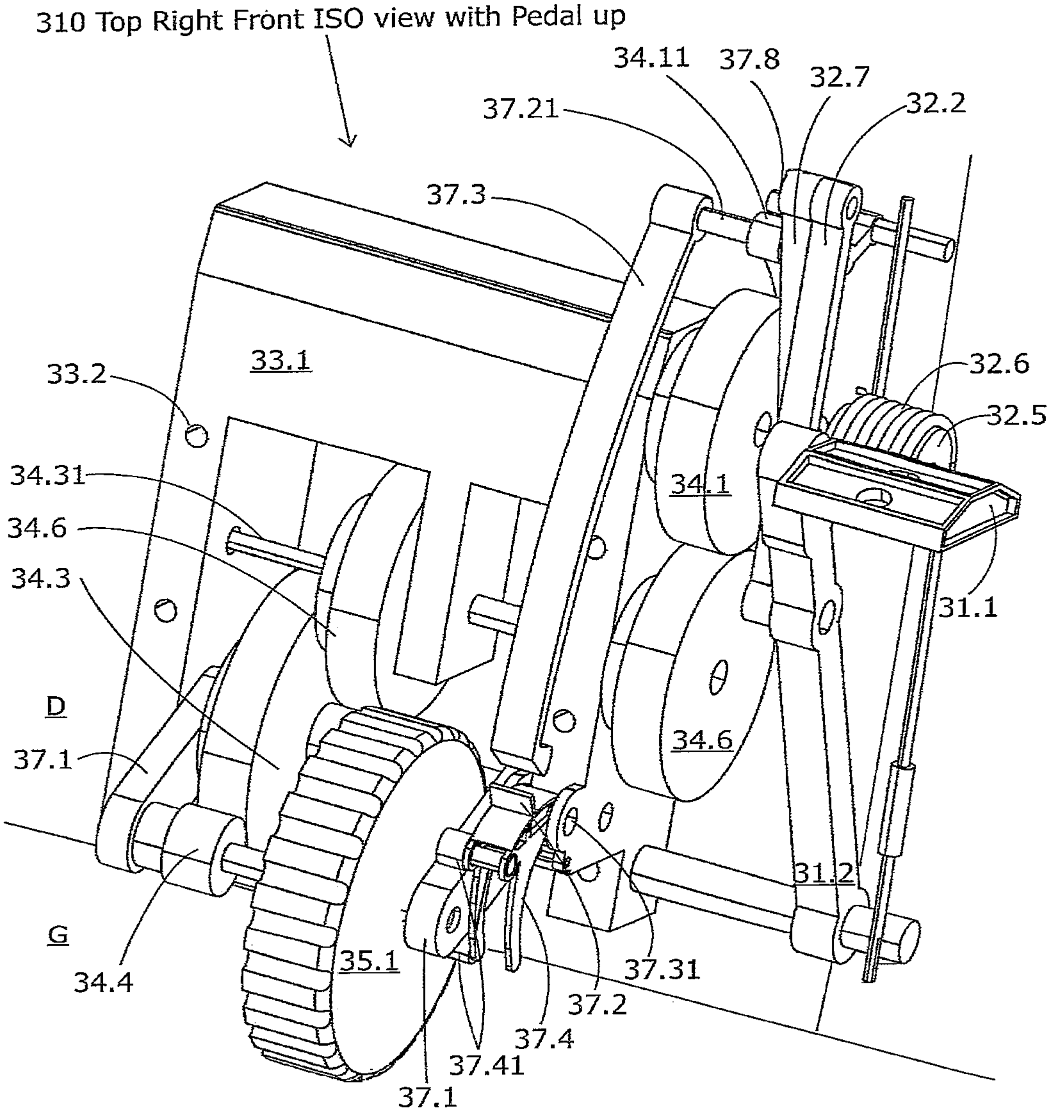
FIG. 8 is a top right front isometric view of the second embodiment of with the pedal up position.
Figure 9:
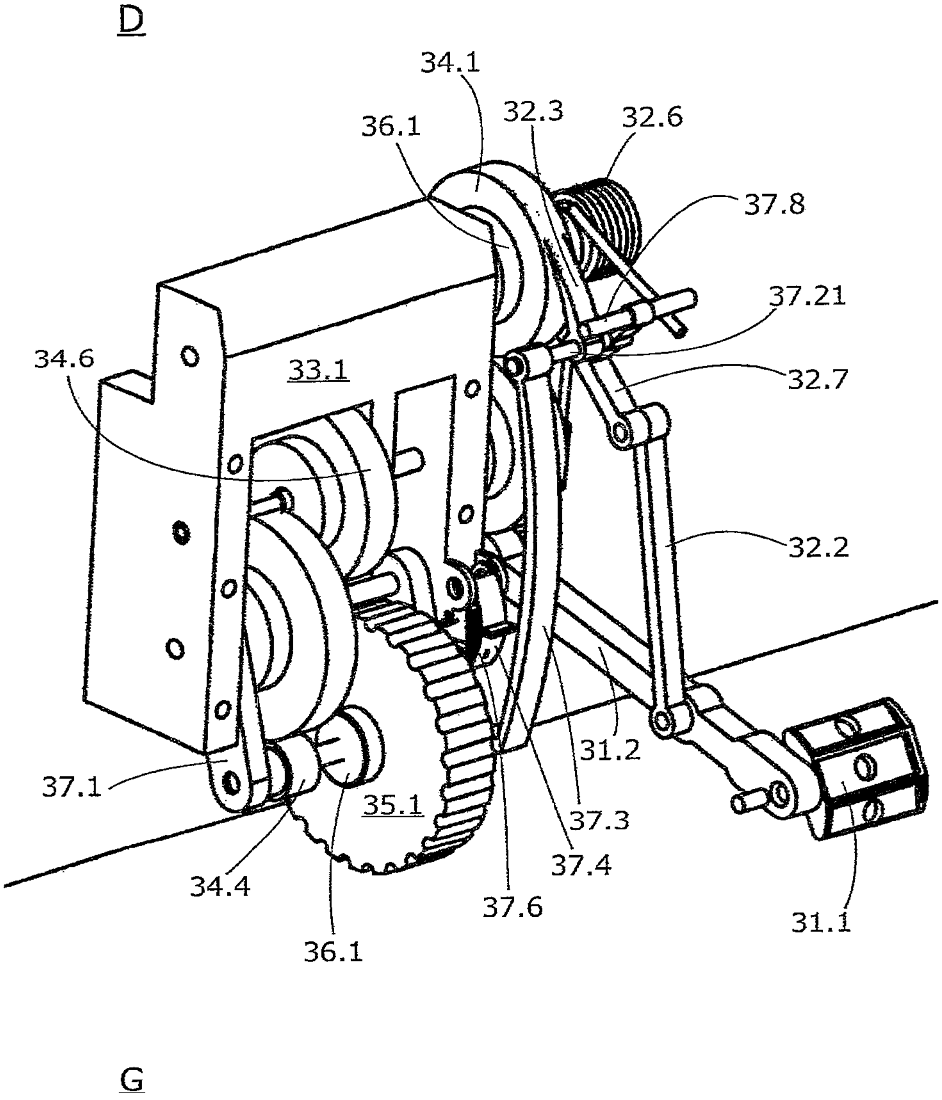
FIG. 9 is a top left front isometric view of the second embodiment of FIG. 7, shown with the pedal down, but with a delay slip clutch assembly to allow a user time to step away from an opening door.

In a second embodiment, as shown in FIGS. 7-9 the current configuration of the door opener is divided into seven distinct operations. The first operation is the crank assembly, 31.0. The cycle is initiated when the pedal, 31.1 is depressed which moves the crank arm, 31.2, down transferring the force to the crankshaft, 31.3. The crank arm returns back to the home position over the course of the opening cycle, with the assistance of the main spring, 32.6, through the trigger actuator pin, 37.8. The crank arm, 31.2, is connected to the driver arm, 32.7, through the connecting link, 32.2.

The next operation is the drive assembly, 32.0. The drive assembly is connected to the main spring, 32.6, when the pedal and crank arm are depressed, the main spring winds up and turns the main gear, 34.1, through the transfer shaft, 32.5, which has a clutch bearing, 34.11, centered around the shaft, 32.5. This allows for the one-way travel of the gear with no backlash or backward movement. The main gear is held in place and not allowed to unwind the main spring by the drive pawl, 32.3, which is depressed and set by the connecting link, 32.2. Winding the main spring, 32.6, The chassis, 33.1, houses all the different mechanisms and bushings within the chassis. It is also accommodates the means of securing the mechanize with screws or clamps to the door.

The gear train, 34.0. has a speed increasing ratio of 1 to 10. This is so a 60-90 degree turn on the crank arm, 31.2, will net 2½ to 3 full revolutions of the 04-inch wheel, 35.1. This is enough to open the door 25 to 30 inches. The main Spring, 32.6, drive the main gear, 34.1, and meshes with the transfer gears, 34.6. The large transfer gears steps down to the small idler gear, 34.2, which again steps up to the secondary speed increasing gear, 34.3, and eventually to the drive gear, 34.4. The drive gear is mounted on the same shaft, 34.5, as the drive wheel, 35.1.

The drive wheel assembly, 35.0, consists of a soft durometer wheel connected to the main driveshaft, 34.5, connected to the drive shaft. The potential energy of the springs, 32.6, are wound with the depression of the pedal, 31.1 and the crank arm, 31.2, connected to the driver arm, 32.7 through the connecting link, 32.2, which winds the spring, 32.6. The potential energy is held back, momentarily, not allowed to release.

The delay assembly, 36.0, holds and delays the release of the potential energy of the wound springs. This allows safe ergonomic transfer of one's weight to both feet. This unique feature enables one's weight to be planted back on the ground. This allows the entrant to comfortably step aside to clear the swinging door.

The delay assembly consists of spring-loaded pneumatic cylinder, (not shown). The cylinder is compressed by means of the main crankshaft, when the pedal and crank arm, is depressed. Cylinder, with the aid of hoses, and check valves, moves air to the piston of a single action pin cylinder, and plunger. This plunger depresses a pawl, which engages a ratcheting wheel, which is directly connected to the main drive wheel. Air escapes from the compressed chamber, adjusted with a needle valve, regulating the delay. As the pressure is released, the plunger, disengages with the aid of a tension spring, allowing the pawl, to release the ratchet, on the main wheel.

Alternately the method includes the use of a spring loaded dash pot with plunger to be used in leu of the single acting pin cylinder. This would be mechanically activated. This would eliminate the need for the pneumatic cylinder, hoses, and check valves. This delay releases the stored potential from the main springs and starts the cycle of the wheel turning without losing any potential energy.

Alternately the method includes a friction clutch plate, 36.1, to restrain said drive wheel, 35.1, or main gear, 34.1, for a fixed or variable length of time, as shown in FIG. 4E.

The traction tension assembly, 37.0, regulates adhesive, slippage or coefficient of friction of the various components on surfaces upon which they move. It is actuated when the main pedal crank arm, 31.2, is depressed. This rotates and drops the connecting arm, 37.21, which in turn drops the carriage depressing arm, 37.3. The depressing arm actuates bracket arm, 37.1 by engaging the actuating arm, 37.2, it engages the traction spring, 37.6. This keeps constant variable pressure on the bracket arm, 37.1, so there is constant pressure on the sloping floor.

As the drive pawl, 32.3, rotates along with the main gear, 34.1, the peddle, 31.1, transfer arm, 32.2, and connecting arm, 37.21, all lift the carriage depressing arm, 37.3. This in turn causes the depressing arm to lift the bracket arm, 37.1 by engaging the actuating arm, 37.2, which in turn engages the traction spring, 37.6, lifting the bracket arm, 37.1, and retracting the wheel, 35.1, so door, D, can now swing freely, back to the closed position with aid of the overhead of floor mounted, or spring-loaded hinges. This allows the door to close without human assistance.

Figure 10:
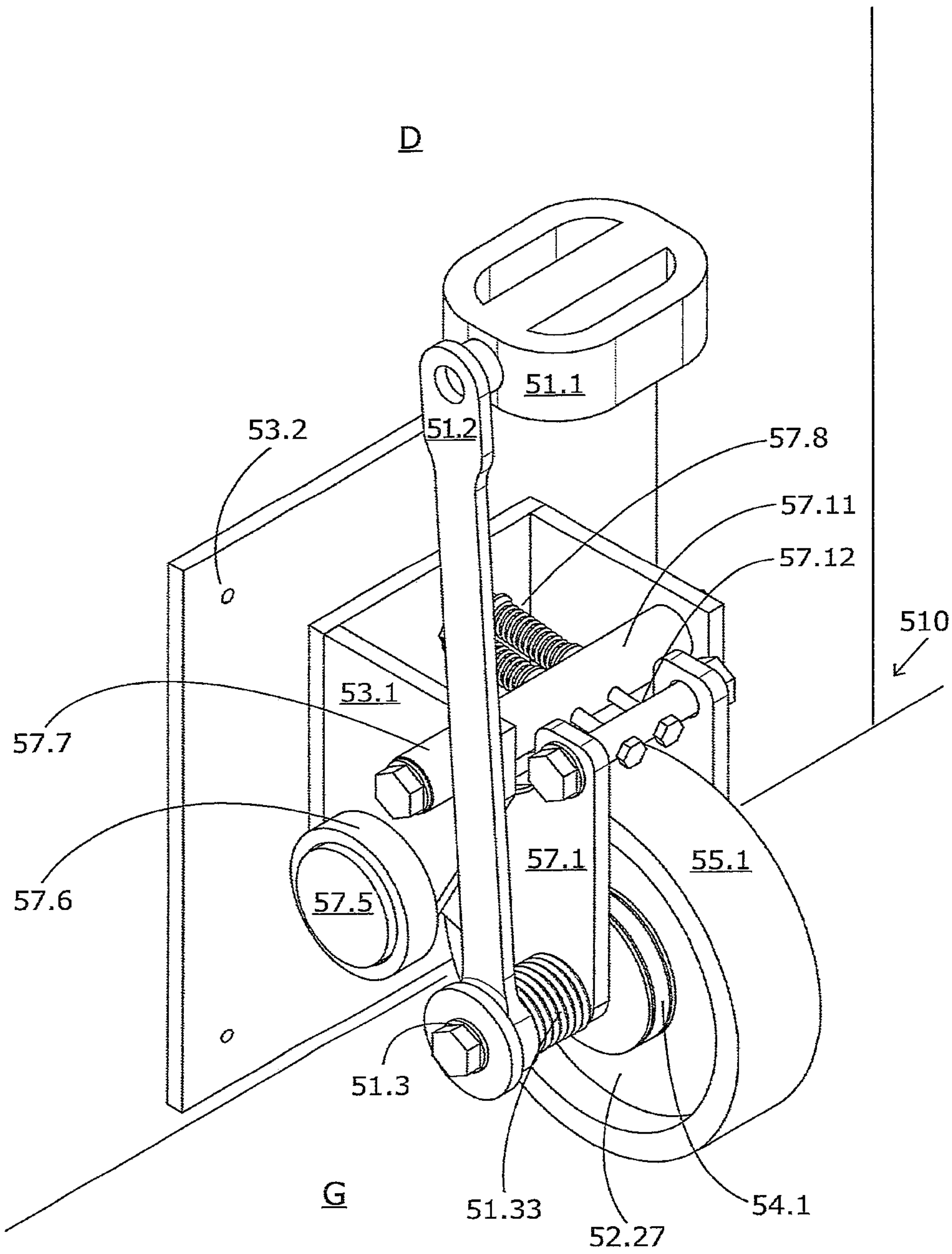
FIG. 10 is a left side isometric view of a third embodiment for a foot operable door opener, shown with the pedal in an up position.
Figure 11:
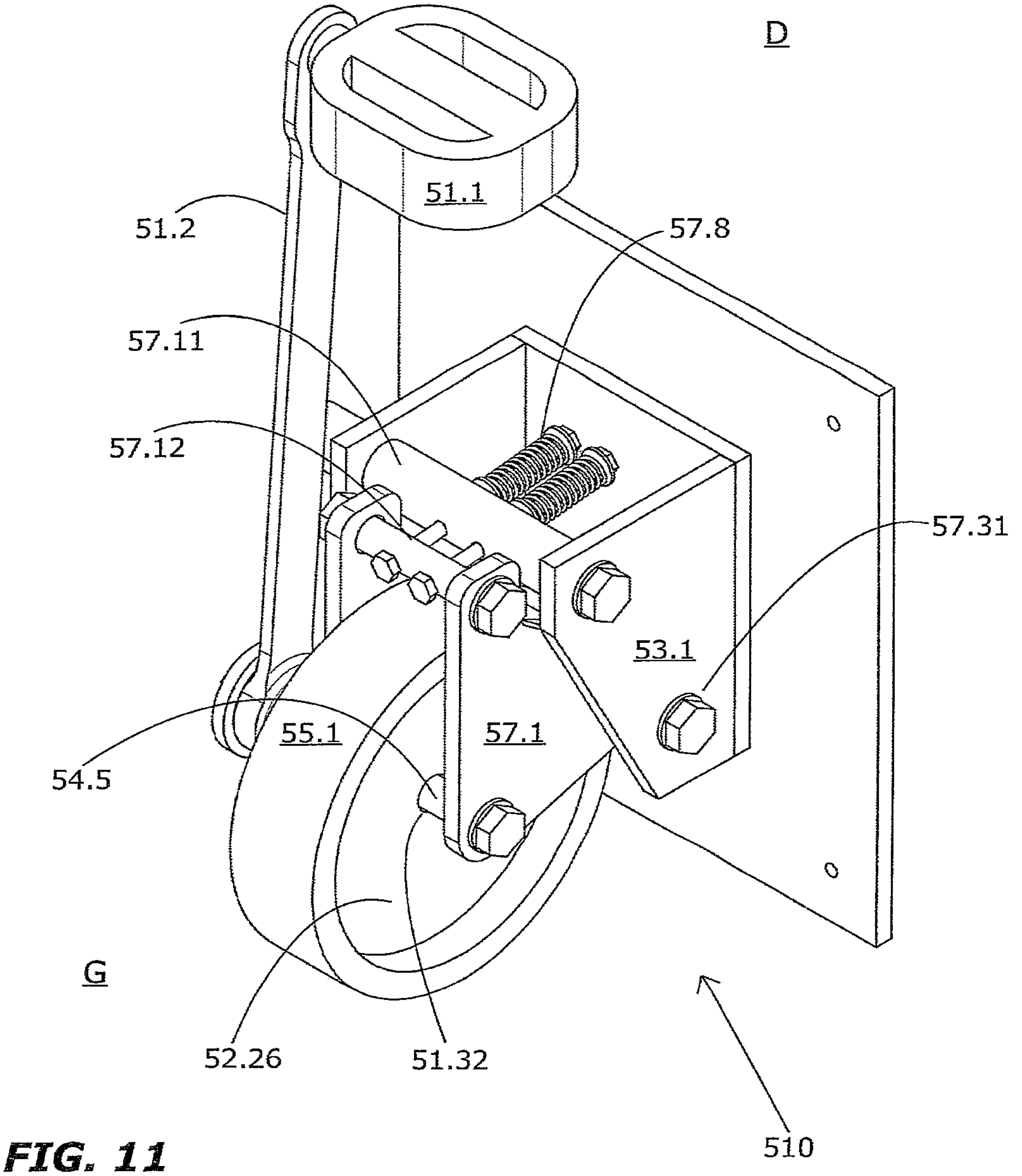
FIG. 11 is a right-side isometric view of the third embodiment for a foot operable door opener, shown with the pedal in an up position.
Figure 12:
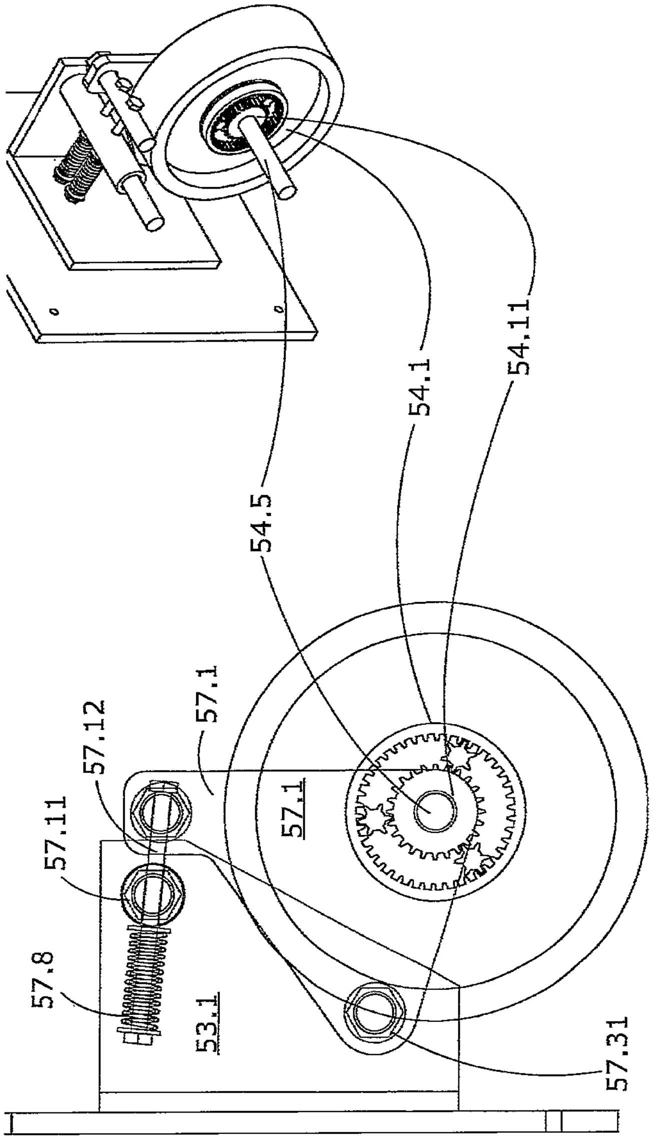
FIG. 12 is an exploded detail view of a planetary gear associated with the third embodiment.

In a third embodiment shown in FIGS. 10-12, a non-motorized foot operable door opener is initiated in an entrance cycle by the user stepping on a pedal, 51.1. This force exerted on the pedal 51.1, drives the crank arm, 51.2, a sixty to ninety (60-90) degree turn, engaging a soft wheel, 55.1, to open the door D. The pedal, 51.1, is hard linked to a crank arm, 51.2, which goes into a unidirectional clutch bearing, 54.11, connected to a planetary gear box, 54.1, connected to drive shaft hub, 54.5, to turn the soft wheel, 55.1. The downward pressure from the pedal, 51.1, pivots the bracket arm, 57.1, at a traction locking ratchet, 57.5, and hinge, 57.31, connected to the main chassis, 53.1, is a spring-loaded wheel assembly, 57.6, to keep constant pressure to the ground, G.

A speed increasing planetary gear box, 54.1, winds one or more. springs, 52.27 and 52.26, (right and left-handed) which may work optionally if the sequence is reversed and goes from crank arm to gears, to winding springs, or also optionally multiple pumps of the pedal, turns the wheel system, which each are connected to drive shaft, 54.5, in turn rotating the wheel, 51.1, over multiple 360 degrees rotations, and thereby opening the door, D, sufficiently to allow the entrant to pass until the foot pedal, 51.1, is dis-engaged by the entrant. The crank arm, 51.2, is returned to its original position, with the aid of the return arm spring, 51.33. This action causes the crank arm, 51.2, to strike the trigger lever release, 57.7, which in turn releases the ratcheting hinge mechanism and spring, 57.5, and 57.6, allowing the wheel return lifting springs, 57.8, to lift the wheel assembly to rotate up, back to its original up position, guided by the guide pin and stop, 57.11, and 57.12, releasing the wheel, 55.1, from the ground, thus allowing the door to close with a standard overhead closer or spring-loaded hinge, which is standard hardware on most doors. At that time after the opening and closing of the door, the door is ready for the next entrant.

The embodiment of FIGS. 10-12 may include an optional, main spring, or springs, 52.27, and 52.26, both right and left-handed, which can be wound for a further assist to accommodate a delayed action, 56.0, where, at that point, a foot switch actuated spring-loaded wheel drops and engages an opening cycle as described above. The door which, after actuation, will close after a time delay, 56.0, on the retracting spring mechanism, also described above. Both opening and closing are by mechanical advantage, without the use of electric power or motors.

In general, in all three embodiments of FIGS. 1-6, 7-9 and 10-12, the present invention is differentiated, unique, novel, and distinguishable from any motorized prior art door openers, by its' being a simple machine without electric power, electric motors, scanner or traffic readers of any kind, and through mechanical advantage and a rachet, spring loaded hinge assembly, to keep constant pressure to the floor plane, hygienically opening doors when safety from disease, virus, bacteria, or other hazards which are wished to be avoided and hands free operation when ones hands are occupied such as food service and warehouse personnel, by the use of an economical apparatus that can be added/or retro fit to any door type, through brackets or the chassis mounting holes, or clamping plate, to secure to wood, hollow metal, metal framed glass, all glass, etc. doors, to facilitate ingress and egress passages of all types, locations, and environments.

In general, in all three embodiments of FIGS. 1-6, 7-9 and 10-12, the present invention is differentiated, unique, novel, and distinguishable from any non-motorized prior art door openers, by its' being a simple machine that can develop the mechanical advantage necessary to open exterior and other doors safely, hands free with integrated delay, to afford using an ergonomically user friendly and safe interface when paired with doors which have standard resistance due to the presence of overhead, floor closers, and spring hinges.

It is further noted that while FIGS. 4A, 4B, 4C, 5A, 5B and 6 are shown in conjunction with the preferred embodiment of FIGS. 1-4, it is known that FIGS. 4A, 4B, 4C, 5A, 5B and 6 can also be used with the alternate embodiments of FIGS. 7-9 and 10-12.

A second embodiment shown in drawing FIGS. 7, 8 and 9 describes a non-preferred embodiment with a friction slip clutch delay assembly and where the gear train includes a main gear, an idler increasing gear and a secondary gear.

A third embodiment shown in drawing FIGS. 10, 11 and 12 describes another non-preferred embodiment, optionally without a delay assembly, and where the gear train is a planetary gear assembly.

It is further known that other modifications may be made to the present invention, without departing the scope of the invention, as noted in the appended Claims.

We claim:

1. A method of constructing and using a foot operable door opener without use of hands or electrical assist, comprising:

a) providing a crank assembly comprising a crank arm rotated from a starting position before any operations by depression of a foot pedal for rotating a crank shaft, which, in turn, activates a spring assembly connected to said crank arm through said crank shaft;

for winding at least one main spring, said at least one main spring being wound by said crank assembly, said at least one main spring being at least one wound spring to develop a stored potential energy and manifested power to perform the work required to open a door, said stored potential energy and manifested power being transferred to a gear train with a preselected speed increasing gear train ratio for transferring said stored potential energy and manifested power from said at least one main spring to rotate a wheel assembly;

b) providing a drive assembly comprising a durometer drive wheel or a pneumatic drive wheel, connected to a main driveshaft; or, c) providing a traction tension assembly actuated by said foot pedal for winding said at least one main spring for rotating said crank shaft for swinging said door open; or, d) providing a delay assembly for a delayed release of said stored potential energy and manifested power of said at least one main spring to said main drive shaft in order to allow ergonomic transfer of the weight of the entrant to both feet, allowing the entrant to step aside to clear the path of the swinging of said door; or, e) providing said delay assembly for a delayed release of said drive wheel at an end of an opening cycle to allow ergonomic passage allowing the entrant to comfortably step through an open portal of said door before integrated closing devices close said door behind the entrant;

f) providing a return spring mounted on said crank shaft for returning said crank shaft to said starting position;

g) whereby the step of the entrant using said foot operable door opener opens said door without use of hands or electrical assist.

2. The method of claim 1 in which said gear train includes a clutch bearing allowing for one-way travel of said gear train with no backlash or backward movement.

3. The method of claim 2 in which said gear train has said speed increasing gear train ratio of approximately 1 to 10.

4. The method of claim 1 further comprising the steps of engaging a spring loaded traction tension assembly to open said door by providing the steps of at least one of:

h) in which said delay assembly is selected from the group consisting of a dashpot or a spring-loaded pneumatic cylinder, or a spring or a pneumatic cylinder, or combinations thereof actuated by said crank shaft when said foot pedal and said crank arm are depressed, said spring loaded pneumatic cylinder having an adjustable needle valve, or a fixed orifice restrictor, for allowing air to escape from a compressed chamber in said pneumatic cylinder, regulating said delay assembly which releases said stored potential energy and manifested power from said at least one main spring and starts a cycle of said drive wheel turning without losing any of said stored potential energy and manifested power; or, i) in which said spring loaded pneumatic cylinder or said dashpot, or a plunger, has a piston and is connected to at least one of: said spring-loaded pneumatic cylinder, or said dashpot, or said piston, said plunger is engaging and, applying pressure on a pawl which engages a ratcheting wheel or sprocket, which is directly connected to said drive wheel, whereby metered release of said pressure within said compressed chamber of said pneumatic cylinder through said fixed orifice restrictor causes said delayed release of said spring-loaded plunger, to retract and release said plunger, which in turn releases said ratcheting wheel or sprocket, or combinations thereof, releasing said stored potential energy and manifested power from said at least one main spring with said delayed release of said spring-loaded plunger, and starts said cycle of said drive wheel turning without losing any of said stored potential energy and manifested power;

j) in which a trigger mechanism starts the final cycle of the drive wheel lifting said spring loaded traction tension assembly to initiate closing of said door.

5. The method of claim 4 wherein an activation pin hits an activation trigger when said at least one main spring unwinds at an end of rotation of said at least one main spring, releasing said locking pawl and said spring-loaded mechanism raising up said drive wheel back to said starting position ready for the next said cycle of said drive wheel, turning again by depressing said foot pedal by the entrant without losing any of said stored potential energy and manifested power.

6. The method of claim 1 in which said traction tension assembly is additionally actuated when said crank arm is depressed, rotating said main drive shaft causing a depressing arm to pull down a bracket arm, engaging a spring-loaded mechanism held down by a locking pawl, or combinations thereof, causing a constant downward pressure for a predetermined length of travel, to accommodate an undercut under said door, a threshold, and/or any slope or variation in the path of travel of said foot operable door opener.

7. The method of claim 1 wherein said drive wheel assembly is connected to said crank arm with a set of loops engaging a rotating member, whereby when said foot pedal and said crank arm are depressed, said set of loops turn said rotating member, winding said main spring.

8. The method of claim 1 in which said at least one main spring is a plurality of multiple springs, said plurality of multiple springs each having a left-handed or a right-handed winding orientation to develop said stored potential energy and manifested power, to perform the work required to open said door, said stored potential energy and manifested power being transferred to said gear train with said preselected speed increasing ratio for transferring said stored potential energy and manifested power from said plurality of multiple springs.

9. The method of claim 1 wherein a chassis mounted on said door houses substantially all operative elements of said foot operable door opener.

10. The method of claim 1, wherein said foot operable door opener closes with the aid of existing door closing mechanisms selected from the group consisting of standard spring-loaded door hinges, gravity door hinges, overhead closing mechanisms, and floor mounted door closing mechanisms, said existing door closing mechanisms being further selected from the group consisting of built-in or retrofit door closing mechanisms, or combinations thereof.

11. The method as in claim 1 wherein said drive wheel assembly is connected to said crank arm with a cable loop engaging a drum or said rotating member, whereby when said foot pedal and said crank arm are depressed, said cable loop turns said drum or said rotating member, winding said at least one main spring.

12. The method of claim 1 further comprising the step of providing a chassis assembly to house all associated mechanisms of said foot operable door opener;

providing holes in said chassis assembly to facilitate securing of said foot operable door opener to at least one of new or existing doors;

providing at least one clamping sub plate mechanism to facilitate mounting to variable door types to minimize any potential damage to doors of all types;

providing an ergonomic cover to protect said foot operable door opener from weather, dirt and environmental conditions; and, providing said ergonomic cover to protect, guard and deflect pedestrians from being entangled or tripping on said foot operable door opener.

* * * * *